United States Patent [19]
Taniguchi et al.

[11] Patent Number: 6,105,432
[45] Date of Patent: Aug. 22, 2000

[54] CONTACT TESTER

[75] Inventors: Koji Taniguchi, Neyagawa; Yoshihiro Ueno, Hirakata; Kaoru Matsuoka; Masaru Nakakita, both of Osaka, all of Japan

[73] Assignee: Matsushita Electric Industrial Co., Ltd., Osaka, Japan

[21] Appl. No.: 09/225,759

[22] Filed: Jan. 5, 1999

[30] Foreign Application Priority Data

| Jan. 7, 1998 | [JP] | Japan | 10-001387 |
| Sep. 1, 1998 | [JP] | Japan | 10-247158 |
| Dec. 7, 1998 | [JP] | Japan | 10-347157 |

[51] Int. Cl.[7] ............ G01H 11/00; G01R 33/12
[52] U.S. Cl. ............ 73/649; 324/212; 360/103
[58] Field of Search ............ 73/7, 9, 12, 865.9, 73/865.3, 866, 105, 587, 660–661, 649; 324/212, 454, 210, 211; 360/25, 31, 102, 103, 104, 105, 75

[56] References Cited

U.S. PATENT DOCUMENTS

| 5,038,625 | 8/1991 | Chen | 73/7 |
| 5,545,989 | 8/1996 | Tian et al. | 360/103 |
| 5,625,514 | 4/1997 | Kubo et al. | 360/104 |
| 5,792,947 | 8/1998 | Pogrebinsky et al. | 73/105 |
| 5,880,587 | 3/1999 | Annis et al. | 360/103 |

*Primary Examiner*—Helen C. Kwok
*Attorney, Agent, or Firm*—Renner, Otto, Boisselle & Sklar, LLP

[57] ABSTRACT

The contact tester of the present invention includes: a holding mechanism for holding a disk and rotating integrally with the disk, an arm driving for driving an arm which supports a slider, the slider is provided with a head for recording/reproducing information on/from the disk. In addition, a first vibration detection element for detecting contact between the slider and the disk is provided. Furthermore, a signal transmission for transmitting an output signal of the first vibration detection element and a signal analysis for analyzing the output signal transmitted via the signal transmission are provided, where the first vibration detection element is mounted at a position where a vibration of the arm is not detected.

30 Claims, 25 Drawing Sheets

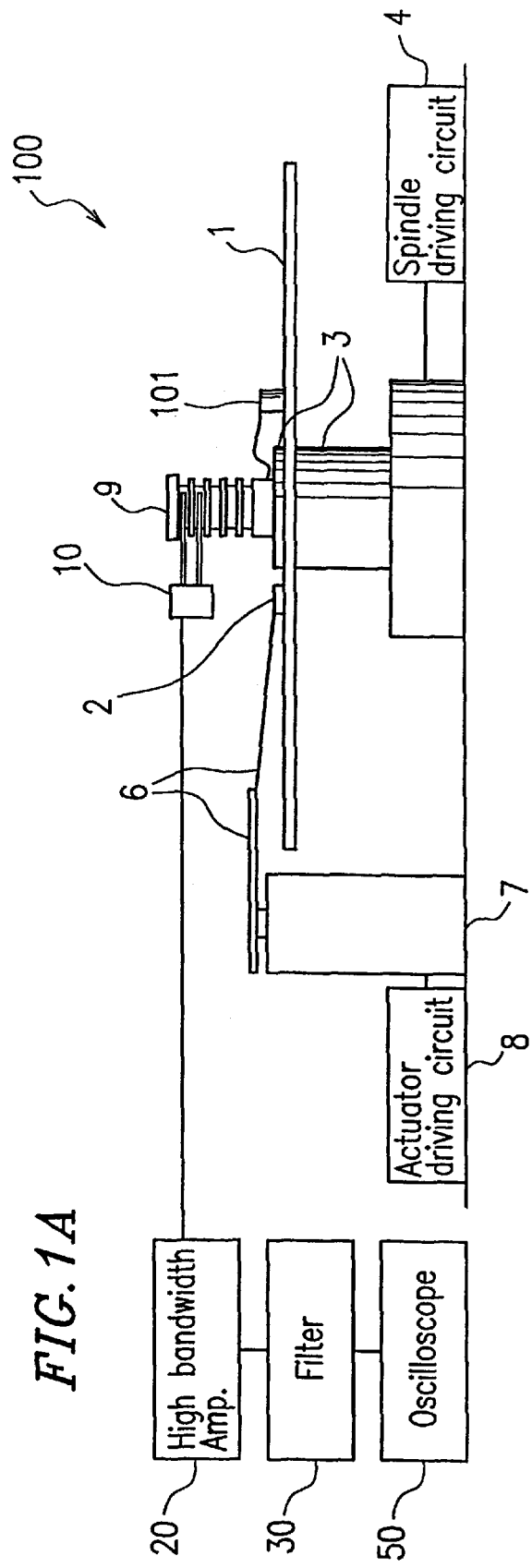

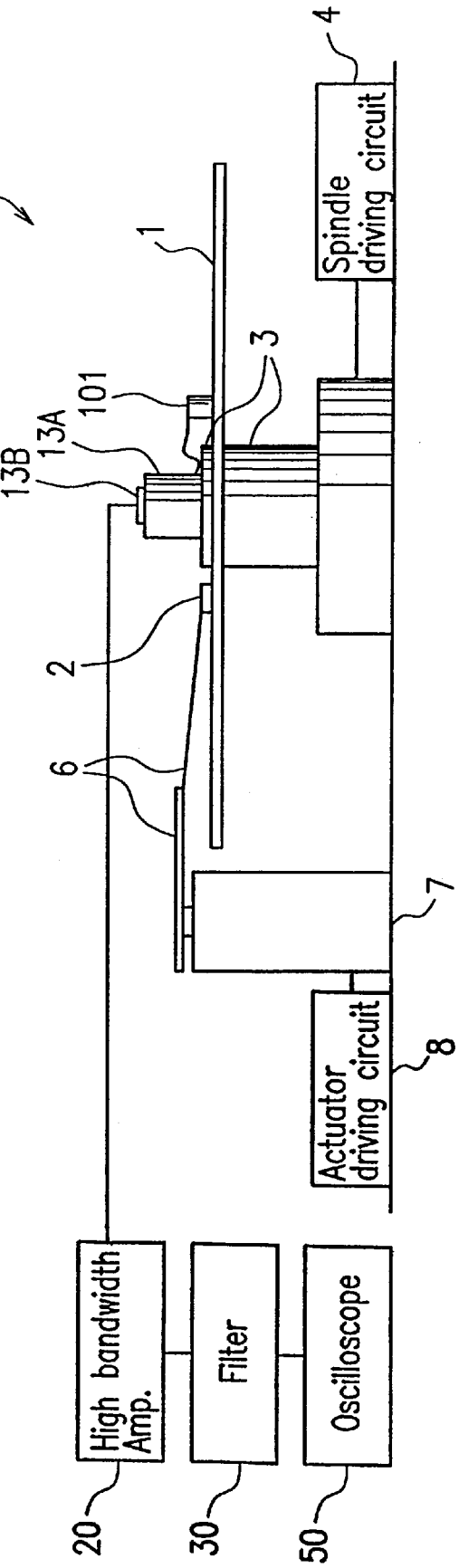
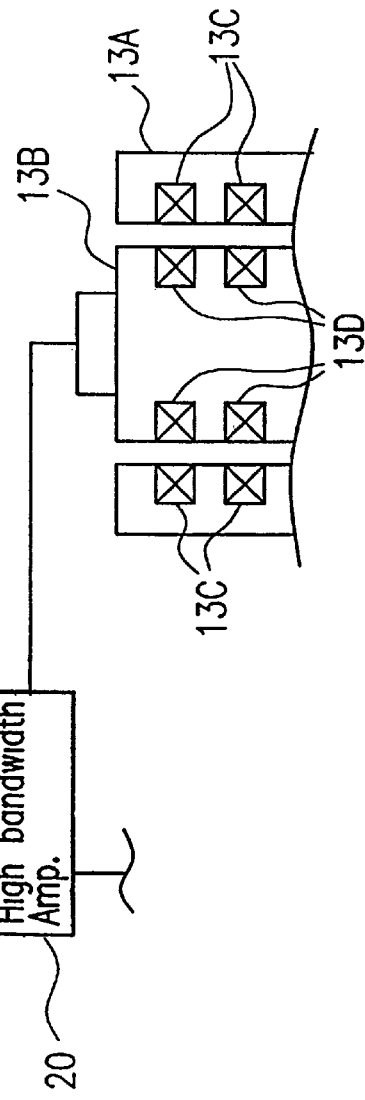
FIG.3A
FIG.3B

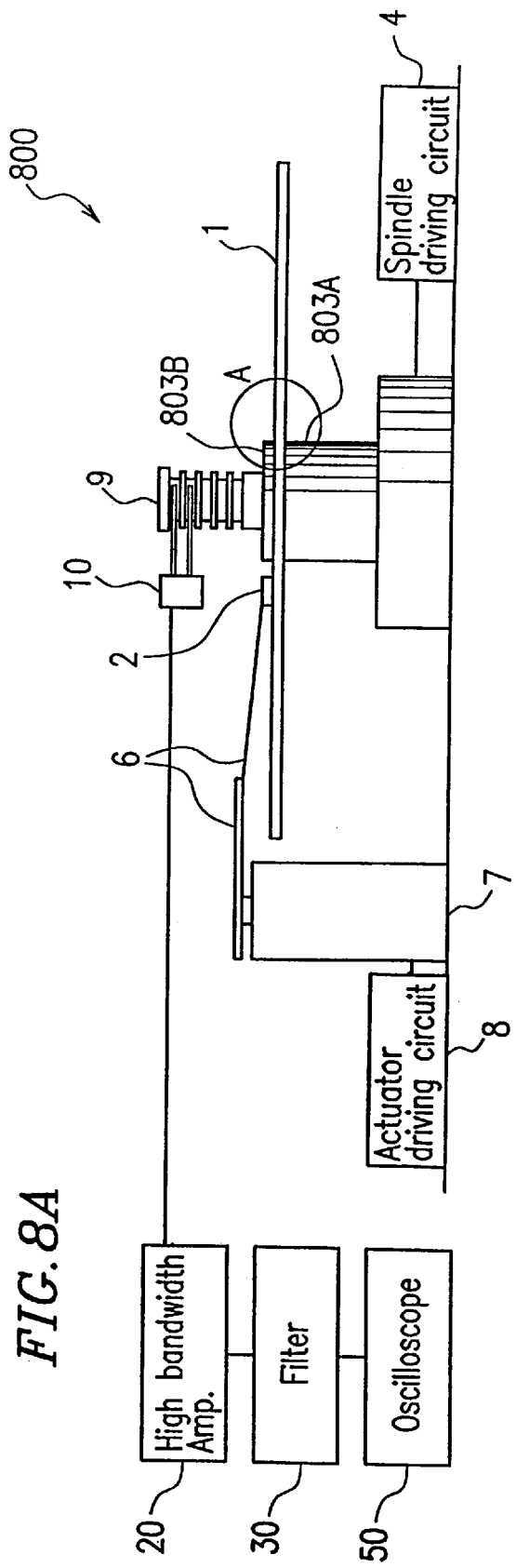
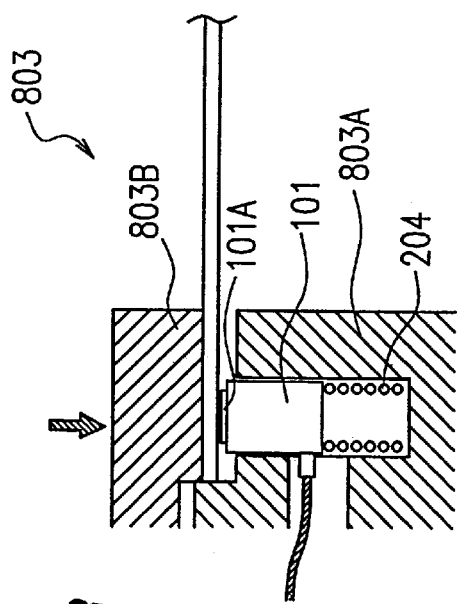
FIG.8A
FIG.8B

CONTACT TESTER

BACKGROUND OF THE INVENTION

1. Field of the Invention

The present invention relates to a contact tester for checking a contact between a slider and a disk of a disk device in order to evaluate mechanical properties and tribological properties of the slider and the disk.

2. Description of the Related Art

In a disk device, for example, a magnetic disk device for magnetically recording and/or reproducing information, a slider provided with a magnetic head is positioned to float above a recording/reproduction surface of a magnetic disk keeping substantially a fixed distance therebetween, to record/reproduce information on/from the magnetic disk.

In the development and manufacture of such a magnetic disk device, various types of test apparatuses are used to ensure the mechanical properties and tribological properties of the slider and the magnetic disk. One of such test apparatuses is a contact tester for checking a contact between the slider and the magnetic disk.

Japanese Laid-Open Publication No. 8-297816 describes a contact tester for checking a contact between a slider and a magnetic disk. Referring to FIG. 24, a conventional contact tester 2400 for checking a contact between a slider and a magnetic disk will be described. A magnetic disk 1 as a recording medium and a slider 2 together with an arm 6 supporting the slider 2 are mounted to the contact tester 2400. The slider 2 is provided with a magnetic head (not shown) for recording/reproducing information on/from the magnetic disk 1. The contact tester 2400 includes: a spindle 3 for holding and rotating the magnetic disk 1; a spindle driving circuit 4 for driving the spindle 3; a voice coil motor 7 as an actuator for moving the arm 6 and thereby moving the slider 2 attached to the arm 6 in a radial direction of the magnetic disk 1; and an actuator driving circuit 8 for driving the voice coil motor 7. The contact tester 2400 further includes: an acoustic emission (AE) or acoustic stress wave sensor 101 as a micro-vibration detection element mounted on the arm 6; a high bandwidth amplifier 20 for amplifying an output signal from the AE sensor 101, a filter 30 for filtering out a frequency component required for the contact test from an output signal from the high bandwidth amplifier 20; and an oscilloscope 50 for displaying an output signal from the filter 30.

The operation of the above conventional contact tester 2400 will be described. The magnetic disk 1 is rotated with the rotation of the spindle 3 at a speed as high as about 5,400 rpm, for example. The slider 2 has an air bearing surface facing a recording/reproduction surface of the magnetic disk 1, and floats above the magnetic disk 1 keeping a substantially fixed distance therebetween. The voice coil motor 7 moves the arm 6 and thus move the slider 2 in a radial direction of the magnetic disk 1. The slider 2 is normally positioned above the magnetic disk 1 by a fixed distance (e.g., about 20 to 50 nm) as described above. In other words, the magnetic disk 1 and the slider 2 are in a non-contact state with each other. Actually, however, the slider 2 often comes into contact with the magnetic disk 1 in such occasions as the start and stop of rotation of the magnetic disk 1 or due to attachment of dust on the slider 2, a configurational defect of the slider 2 and the magnetic disk 1, and the like.

In the conventional contact tester 2400 shown in FIG. 24, the AE sensor 101 as a micro-vibration detection element is mounted on the arm 6, for detecting acoustic emission (AE) or acoustic stress wave generated by a contact between the slider 2 and the magnetic disk 1. The output signal from the AE sensor 101 representing the detection result is amplified to an observable level by the high bandwidth amplifier 20. The amplified output signal is filtered by the filter 30 to remove a noise component, and the filtered output signal is observed using the oscilloscope 50. From the waveform of the output signal of the AE sensor 101 observed with the oscilloscope 50, the strength, duration, and the like of the contact between the slider 2 and the magnetic disk 1 can be evaluated.

The above conventional contact tester 2400 has the following problems. Since the AE sensor 101 is mounted on the arm 6, it detects, not only an AE signal generated in the vicinity of a contact point when the slider 2 comes into contact with the magnetic disk 1, but also a vibration of the arm 6 superimposed on the AE signal. It is not possible to separate an actual AE signal from a signal generated by the vibration of the arm 6. This makes it difficult to improve the precision of the measurement. Another problem is that the mounting of the AE sensor 101 on the arm 6 changes the inertia of the arm 6, causing a difference from an actual system where no AE sensor 101 is mounted. Moreover, since the AE sensor 101 is mounted on the arm 6 supporting the slider 2, it is difficult to evaluate the influence of the contact between the magnetic disk 1 and the slider 2 on the magnetic disk 1 with high precision.

SUMMARY OF THE INVENTION

The contact tester of this invention includes: a holding mechanism for holding a disk and rotating integrally with the disk; arm driving means for driving an arm which supports a slider, the slider being provided with a head for recording/reproducing information on/from the disk; a first vibration detection element for detecting a contact between the slider and the disk; signal transmission means for transmitting an output signal of the first vibration detection element; and signal analysis means for analyzing the output signal transmitted via the signal transmission means, wherein the first vibration detection element is mounted at a position where a vibration of the arm is not detected.

In one embodiment of the invention, the first vibration detection element is mounted on the disk.

In another embodiment of the invention, the first vibration detection element is mounted at the holding mechanism.

In still another embodiment of the invention, the contact tester further includes a second vibration detection element which is mounted on the arm.

In still another embodiment of the invention, the signal transmission means includes: a rotary conductor secured to the holding mechanism to rotate integrally with the holding mechanism; and a contact conductor secured so as to be in contact with the rotary conductor, and the signal transmission means transmits the output signal via a contact between the rotary conductor and the contact conductor.

In still another embodiment of the invention, the rotary conductor includes a slip ring and the contact conductor includes a brush.

In still another embodiment of the invention, the signal transmission means includes: a signal transmitter which rotates integrally with the rotation of the holding mechanism for transmitting the output signal of the first vibration detection element in the air; and a signal receiver for receiving the output signal transmitted by the signal transmitter, and the signal transmission means transmits the output signal in a non-contact manner between the signal transmitter and the signal receiver.

In still another embodiment of the invention, the signal transmitter includes a rotational transformer and the signal receiver includes a fixed transformer.

In still another embodiment of the invention, the contact tester further includes impedance conversion means disposed at the holding mechanism for converting an output impedance of the output signal of the first vibration detection element, wherein the signal transmission means transmits the output signal of which impedance has been converted by the impedance conversion means.

In still another embodiment of the invention, the contact tester further includes a battery disposed at the holding mechanism for supplying electric power to the impedance conversion means.

In still another embodiment of the invention, the impedance conversion means includes a field effect transistor at an input stage thereof.

In still another embodiment of the invention, an input impedance of the impedance conversion means is 10 kilohms or more.

In still another embodiment of the invention, the first vibration detection element includes an AE sensor.

In still another embodiment of the invention, the holding mechanism includes a hydrodynamic bearing.

In still another embodiment of the invention, the contact tester further includes a second vibration detection element mounted on the arm for detecting a contact between the slider and the disk, wherein the signal analysis means includes: first amplifying means for amplifying the output signal sent from the signal transmission means; first effective value operation means for calculating a first effective value from the output signal amplified by the first amplifying means; first signal processing means for determining whether or not the first effective value calculated by the first effective value operation means exceeds a predetermined value and outputting the result as a first determination result; second amplifying means for amplifying a second output signal of the second vibration detection element; second effective value operation means for calculating a second effective value from the second output signal amplified by the second amplifying means; second signal processing means for determining whether or not the second effective value calculated by the second effective value operation means exceeds a predetermined value and outputting the result as a second determination result; and contact determination means for determining a contact between the slider and the disk based on the first determination result and the second determination result.

In still another embodiment of the invention, the holding mechanism includes signal amplifying means for amplifying the output signal, and the signal transmission means transmits the output signal amplified by the signal amplifying means.

In still another embodiment of the invention, the contact tester further includes power supply means for supplying electric power to the signal amplifying means.

In still another embodiment of the invention, the contact tester further includes a battery mounted at the holding mechanism for supplying electric power to the signal amplifying means.

In still another embodiment of the invention, the signal amplifying means includes a field effect transistor at an input stage thereof.

In still another embodiment of the invention, an input impedance of the signal amplifying means is 10 kilohms or more.

In still another embodiment of the invention, the holding mechanism includes an elastic member for urging the first vibration detection element toward the disk with a constant force.

In still another embodiment of the invention, the contact tester further includes an acoustic blocking member disposed between the disk and the holding mechanism for isolating the disk from a vibration from the holding mechanism.

In still another embodiment of the invention, the contact tester further includes: rotational speed detection means for detecting the rotational speed of the disk; relative speed calculation means for calculating a relative speed between the disk and the slider based on the rotational speed and a position of the slider and outputting the result; and effective value calculation means for calculating an effective value of the output signal and outputting the result.

In still another embodiment of the invention, the contact tester further includes: a first memory for storing a first expression representing a relationship among the relative speed, the effective value, and a normal force between the slider and the disk; and normal force calculation means for calculating the normal force based on the relative speed calculated by the relative speed calculation means, the effective value calculated by the effective value calculation means, and the first expression stored in the first memory.

In still another embodiment of the invention, the first expression is:

$$V=\alpha(Nv)^{0.5}+\beta$$

wherein V denotes the effective value of the output signal of the first vibration detection element, v denotes the relative speed between the slider and the disk, N denotes the normal force between the slider and the disk, and $\alpha$ and $\beta$ denote constants.

In still another embodiment of the invention, the contact tester further includes: a second memory for storing a second expression representing a relationship among the relative speed, the effective value, the normal force between the slider and the disk, and an abrasion coefficient of the slider; and abrasion coefficient calculation means for calculating the abrasion coefficient based on the relative speed calculated by the relative speed calculation means, the effective value calculated by the effective value calculation means, the normal force calculated by the normal force calculation means, and the second expression stored in the second memory.

In still another embodiment of the invention, the second expression is:

$$V=\alpha(kNv)^{0.5}+\beta$$

wherein V denotes the effective value of the output signal of the first vibration detection element, v denotes the relative speed between the slider and the disk, N denotes the normal force between the slider and the disk, k denotes the abrasion coefficient of the slider, and $\alpha$ and $\beta$ denote constants.

In still another embodiment of the invention, the contact tester further includes: at least one additional first vibration detection element; and a signal generator for applying a voltage to at least one of the first vibration detection elements.

In still another embodiment of the invention, the first vibration detection element includes two vibration detection elements, one of the two vibration detection elements having a first frequency characteristic and the other vibration detection element having a second frequency characteristic which is different from the first frequency characteristic.

In still another embodiment of the invention, the first vibration detection element includes at least one vibration detection element, and the entire gravity of the at least one vibration detection element substantially exists on a rotational center axis of the holding mechanism.

Thus, the invention described herein makes possible the advantage of providing a contact tester for checking a contact between a magnetic disk and a slider in which the influence of a vibration of an arm on the detection of a contact between the magnetic disk and the slider is reduced, a system to be evaluated is not influenced by the mounting of a micro-vibration detection element thereon, and the influence of the contact on the magnetic disk can be evaluated with high precision.

This and other advantages of the present invention will become apparent to those skilled in the art upon reading and understanding the following detailed description with reference to the accompanying figures.

BRIEF DESCRIPTION OF THE DRAWINGS

FIG. 1A is a block diagram illustrating a contact tester of Embodiment 1 according to the present invention;

FIG. 3A is a block diagram illustrating a contact tester of Embodiment 3 according to the present invention;

FIG. 3B is a block diagram illustrating a main portion of the contact tester of Embodiment 3;

FIG. 8A is a block diagram illustrating a contact tester of Embodiment 8 according to the present invention;

FIG. 8B is an enlarged sectional view of portion A of FIG. 8A;

DESCRIPTION OF THE PREFERRED EMBODIMENTS

Hereinbelow, the present invention will be described by way of examples with reference to the accompanying drawings.

Embodiment 1

Figure 24:
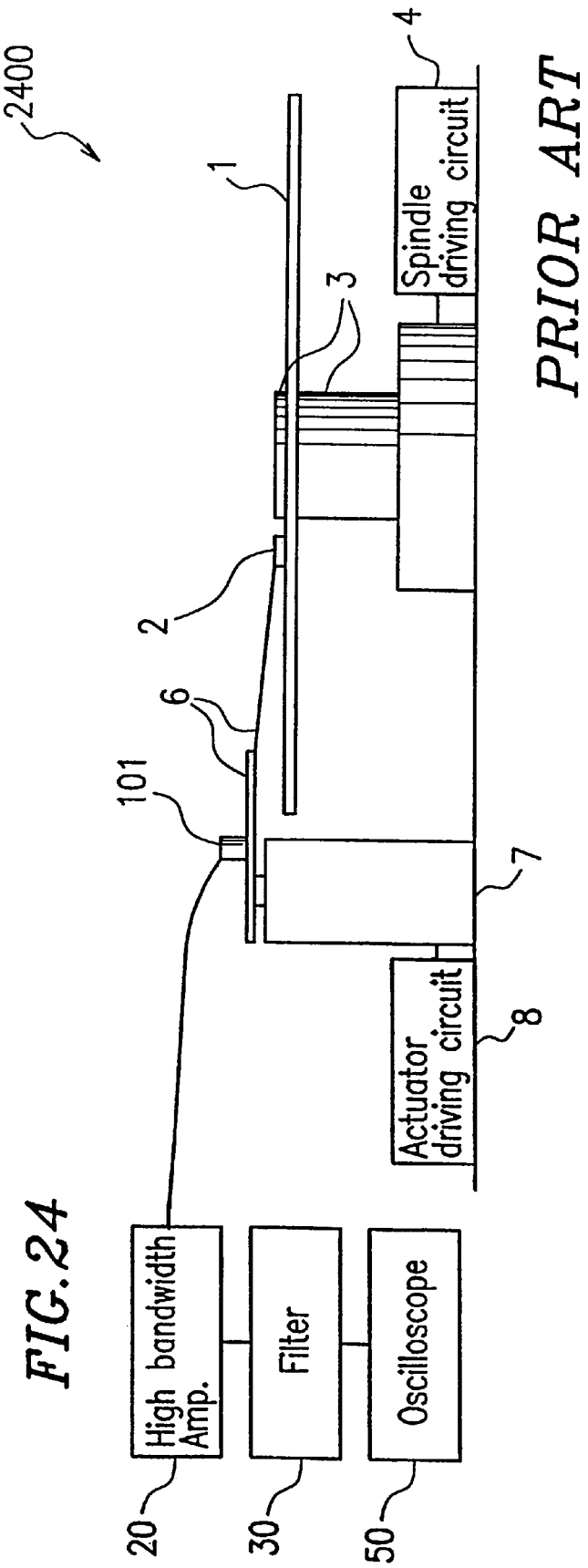
FIG. 24 is a block diagram illustrating a conventional contact tester.

FIG. 1A illustrates a contact tester 100 of Embodiment 1 according to the present invention. In FIG. 1A, components corresponding to those in FIG. 24 are denoted by the same reference numerals, and detailed description of these components is omitted here.

Referring to FIG. 1A, a magnetic disk 1 as a recording medium and a slider 2 together with an arm 6 supporting the slider 2 are mounted to the contact tester 100. The slider 2 is provided with a magnetic head (not shown) for recording/reproducing information on/from the magnetic disk 1. The contact tester 100 includes: a spindle 3 as a holding mechanism for holding and rotating the magnetic disk 1; a spindle driving circuit 4 for driving the spindle 3; a voice coil motor 7 as an actuator for moving the arm 6 and thereby moving the slider 2 attached to the arm 6 in a radial direction of the magnetic disk 1; and an actuator driving circuit 8 for driving the voice coil motor 7. The contact tester 100 further includes: an acoustic emission (AE) sensor 101 as a micro-vibration detection element mounted on the magnet disk 1; a high bandwidth amplifier 20 for amplifying an output signal from the AE sensor 101, a filter 30 for filtering out a frequency component required for the contact test from an output signal from the high bandwidth amplifier 20; and an oscilloscope 50 for displaying an output signal from the filter 30. The contact tester 100 of this embodiment additionally includes a slip ring 9 as a rotary conductor and a brush 10 as a contact conductor.

More specifically, the magnetic disk 1 is secured to the spindle 3 with a screw, for example. A DC servo motor is used for driving the spindle 3, which is set so that the magnetic disk 1 is rotated at a constant speed in the range of 0 to about 10,000 rpm. A hydrodynamic bearing, which is to be described hereinbelow, is used as a bearing of the spindle 3. The slider 2 provided with a magnetic head (not shown) is attached to the arm 6. The slider 2 has an air bearing surface on the side facing a recording/reproduction surface of the magnetic disk 1. The air bearing surface, which is formed by mechanical processing or etching, is pressed against the recording/reproduction surface of the magnetic disk 1 by the arm 6 with a constant load of 30 mN, for example. When the magnetic disk 1 is rotated, a pressure is generated on the air bearing surface of the slider 2 by the rotation of the magnetic disk 1, allowing the slider 2 to float above the magnetic disk 1. The arm 6 is attached to the voice coil motor 7 as an actuator, and swings around an axis of the voice coil motor 7, as the voice coil motor 7 swings, allowing the slider 2 attached to the arm 6 to move in a radial direction of the magnetic disk 1. The AE sensor 101 is mounted on the recording/reproduction surface of the magnetic disk 1 as a micro-vibration detection element. When the slider 2 comes into contact with the magnetic disk 1 for some reason, acoustic emission (AE) or acoustic stress wave is generated at the contact point. The AE sensor 101 detects the AE or the acoustic stress wave and converts it into an electrical signal.

The output signal of the AE sensor 101 is guided by the slip ring 9 and the brush 10 as a signal transmission means, to be retrieved outside the spindle 3. The retrieved output signal of the AE sensor 101 is then amplified by the high bandwidth amplifier 20 to an observable level. The amplified output signal of the AE sensor 101 is filtered by the filter 30 to obtain only a frequency component required for observation. The filtered output signal of the AE sensor 101 is observed on the oscilloscope 50 as a display means. From a signal waveform observed on the oscilloscope 50, the strength, duration, and the like of the contact between the slider 2 and the magnetic disk 1 can be evaluated.

In this embodiment, the AE sensor 101 was used as a micro-vibration detection element. Other elements which can detect micro-vibration generated by a contact between the slider 2 and the magnetic disk 1, such as an acceleration sensor and a distortion gauge, can also be used. In this embodiment, only one AE sensor was used. Alternatively, a plurality of AE sensors may be mounted on the magnetic disk 1, as described hereinbelow. In this embodiment, a hydrodynamic bearing was used as the bearing of the spindle 3. This is because, if a contact type bearing such as a ball bearing is used, a vibration generated by such a bearing will also be detected by the AE sensor 101, degrading the S/N ratio in the detection of the contact between the slider 2 and the magnetic disk 1. If a sufficiently good S/N ratio can be ensured, any bearing may be used.

Figure 1B:
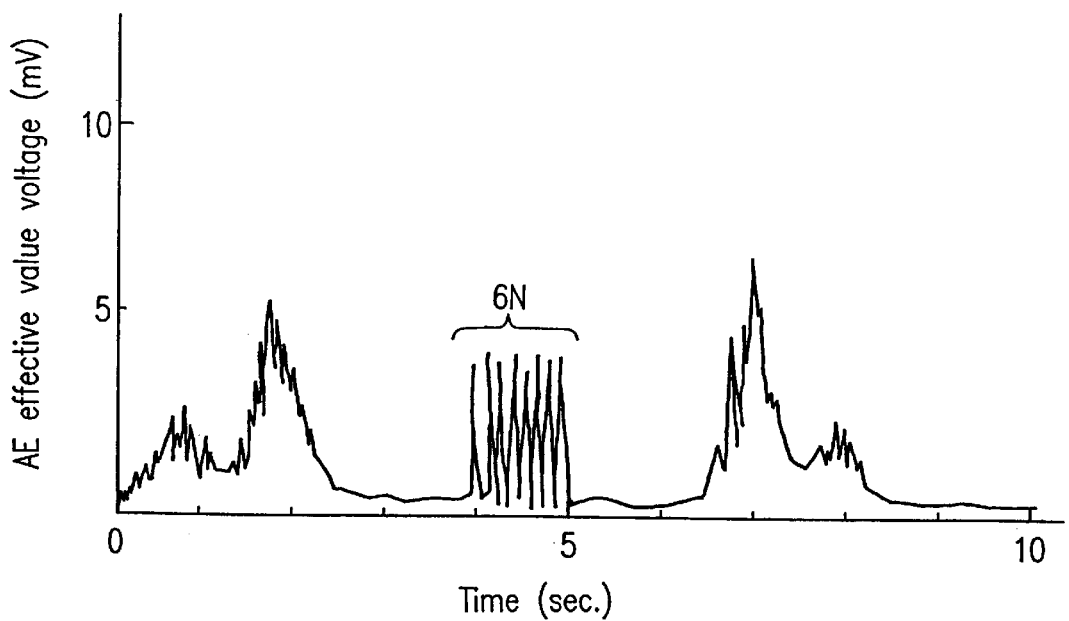
FIG. 1B is a graph showing a change in effective value of an output voltage of an AE sensor when a spindle of a conventional contact tester is subjected to a series of operations including start-up, rotation at a constant speed, and stop.
Figure 1C:
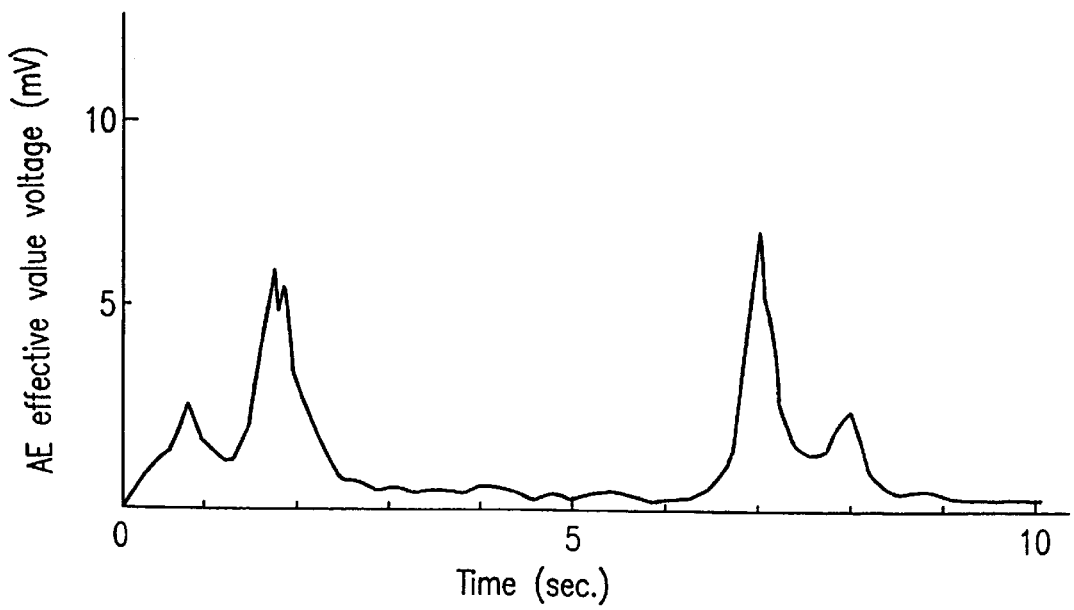
FIG. 1C is a graph showing a change in effective value of an output voltage of an AE sensor when a spindle of the contact tester of Embodiment 1 is subjected to a series of operations including start-up, rotation at a constant speed, and stop.

FIGS. 1B and 1C show a change in effective value of an output voltage of the AE sensor when the spindle 3 was subjected to a series of operations, including start-up, rotation at a constant speed, and stop. At the same time, the arm 6 was swung with the voice coil motor 7 during a time from four to five seconds after the start-up of the spindle 3. FIG. 1B is for the conventional contact tester where the AE sensor is mounted on the arm, and FIG. 1C is for the contact tester of Embodiment 1 according to the present invention. In FIG. 1B, a noise component 6N due to the vibration of the arm 6 is superimposed on the output voltage of the AE sensor. During the swinging of the arm 6, in particular, a large signal was detected despite the fact that actually the slider 2 and the magnetic disk 1 were not in contact with each other. In FIG. 1C, on the contrary, no such noise component is observed, realizing the detection with extremely high precision.

With the above configuration of the contact tester of Embodiment 1, an AE signal generated in the vicinity of a contact point when the slider 2 comes into contact with the magnetic disk 1 is detected by the AE sensor 101 and retrieved outside the spindle 3 by being transmitted through the slip ring 9 and the brush 10. Since the output signal of the AE sensor 101 does not include a signal component generated by a vibration of the arm 6, the influence of the vibration of the arm 6 on the detection of the contact between the slider 2 and the magnetic disk 1 is minimized, and thus the influence of the contact on the magnetic disk can be evaluated with high precision.

Embodiment 2

Figure 2:
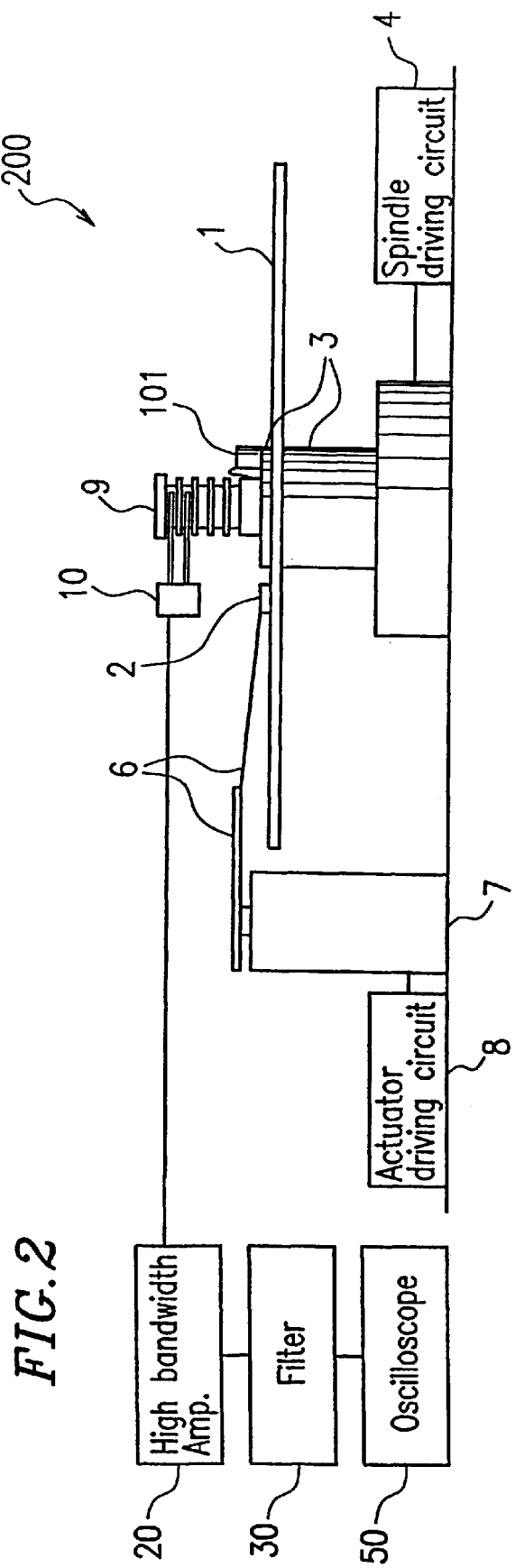
FIG. 2 is a block diagram illustrating a contact tester of Embodiment 2 according to the present invention.

FIG. 2 illustrates a contact tester 200 of Embodiment 2 according to the present invention. In this embodiment, description of portions of the configuration similar to those of Embodiment 1 is omitted.

In Embodiment 1, the AE sensor 101 as a micro-vibration detection element was mounted on the magnetic disk 1. In this embodiment, the AE sensor 101 as a micro-vibration detection element is mounted on the spindle 3 as a holding mechanism.

With the above configuration, the evaluation described above can be performed with high precision without the necessity of removing the AE sensor 101 when the magnetic disk 1 is exchanged. This facilitates the operation efficiency. Moreover, the magnetic disk 1 is free from being damaged by the mounting of the AE sensor 101 thereon.

Embodiment 3

FIG. 3A illustrates a contact tester 300 of Embodiment 3 according to the present invention. In this embodiment, description of portions of the configuration similar to those of Embodiment 1 is omitted.

In Embodiment 1, an output signal of the AE sensor 101 mounted on the magnetic disk 1 was retrieved outside the spindle 3 by use of the slip ring 9 and the brush 10 as a signal transmission means. In Embodiment 3, as shown in FIG. 3B which is an enlarged view of a portion of the spindle 3, a rotational transformer 13A as a signal transmitter and a fixed transformer 13B as a signal receiver are used as a non-contact signal transmission means for the AE sensor 101 mounted on the magnetic disk 1. The rotational transformer 13A is secured to the spindle 3 to be rotated with the rotation of the spindle 3 and transmits a signal in the air. The fixed transformer 13B receives the signal transmitted by the rotational transformer 13A. The rotational transformer 13A includes coils 13C, while the fixed transformer 13B includes coils 13D. When the slip ring and the brush are used, the AE sensor detects, not only a signal generated by a contact between the slider 2 and the magnetic disk 1, but also a vibration generated by a contact sliding between the slip ring and the brush. This degrades the S/N ratio of the measurement. In Embodiment 3 where the rotational transformer 13A and the fixed transformer 13B facing the rotational transformer 13A are used as the signal transmission means, the output signal of the AE sensor 101 can be transmitted in a non-contact manner, improving the S/N ratio of the detection of the contact between the slider 2 and the magnetic disk 1.

Embodiment 4

Figure 4:
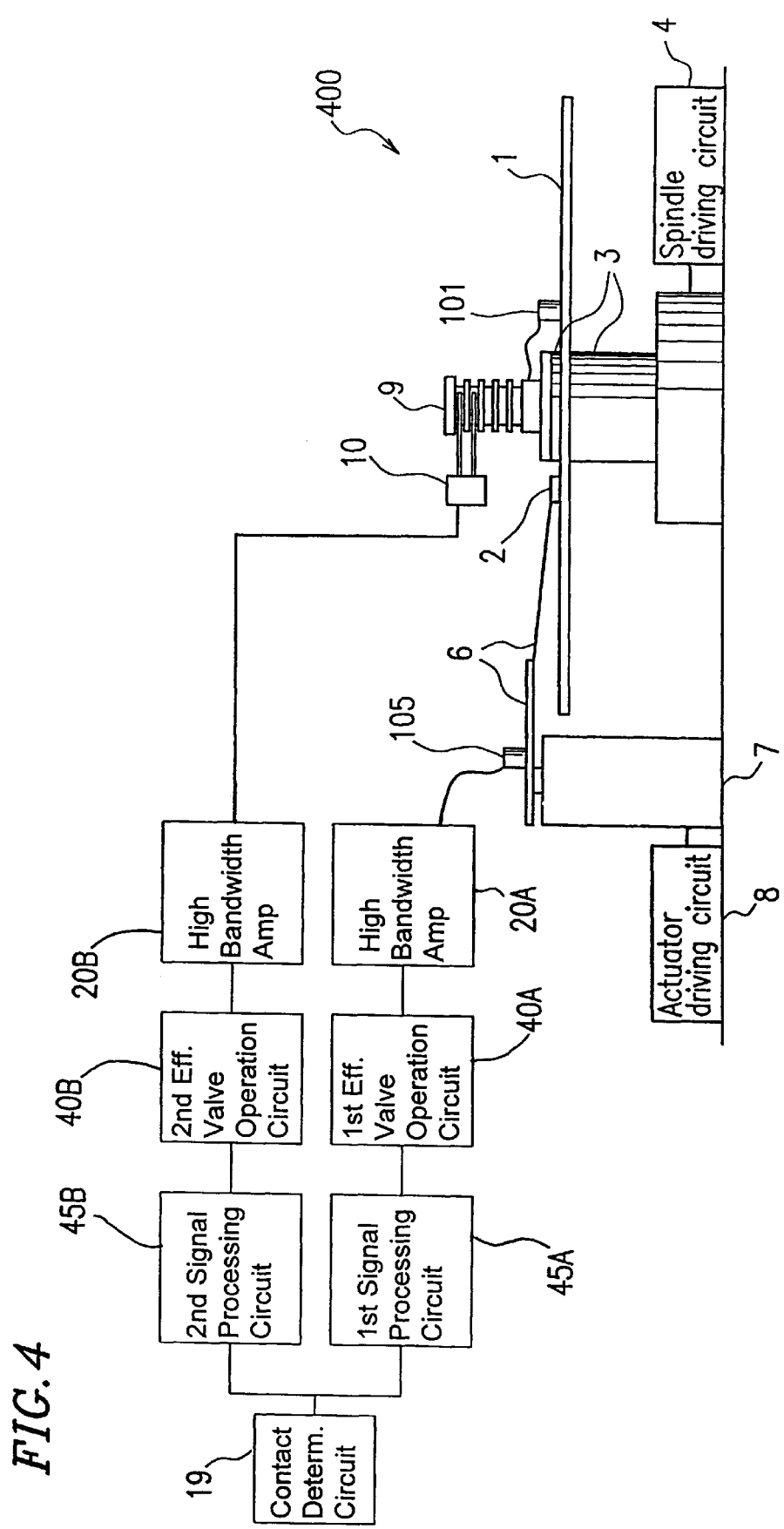
FIG. 4 is a block diagram illustrating a contact tester of Embodiment 4 according to the present invention.

FIG. 4 illustrates a contact tester 400 of Embodiment 4 according to the present invention. In this embodiment, description of portions of the configuration similar to those of Embodiment 1 is omitted.

In this embodiment, an AE sensor 105 as a first micro-vibration detection element is mounted on the arm 6. When the slider 2 comes into contact with the magnetic disk 1 for some reason, an AE or acoustic stress wave is generated at the contact point. The AE sensor 105 detects such an AE or acoustic stress wave and converts it into an electrical signal. An output signal of the AE sensor 105 is amplified by a high bandwidth amplifier 20A to an observable level. The amplified output signal of the AE sensor 105 is sent to a first effective value operation circuit 40A. An effective value signal obtained from the operation by the first effective value operation circuit 40A is then input into a first signal processing circuit 45A. The first signal processing circuit 45A outputs HIGH (5 V) in a TTL level if the input signal exceeds a predetermined value and otherwise outputs LOW (0 V).

The AE sensor 101 as a second micro-vibration detection element is mounted on the magnetic disk 1. An output signal of the AE sensor 101 is guided by the slip ring 9 and the brush 10 as a signal transmission means to be retrieved outside the spindle 3. The retrieved output signal of the AE sensor 101 is then amplified by a high bandwidth amplifier 20B to an observable level. The amplified output signal of the AE sensor 101 is then sent to a second effective value operation circuit 40B. An effective value signal obtained from the operation by the second effective value operation circuit 40B is then input a second signal processing circuit 45B. The second signal processing circuit 45B outputs HIGH (5 V) in the TTL level if the signal exceeds a predetermined value and otherwise outputs LOW (0 V). The output signals from the first signal processing circuit 45A and the second signal processing circuit 45B are sent to a contact determination circuit 19, where a logical AND of the two output signals is calculated to finally determine that the slider 2 and the magnetic disk 1 are in contact with each other.

With the configuration of Embodiment 4 where the contact is checked on both sides of the slider 2 and the magnetic disk 1, the precision of the contact test improves.

Embodiment 5

Figure 5:
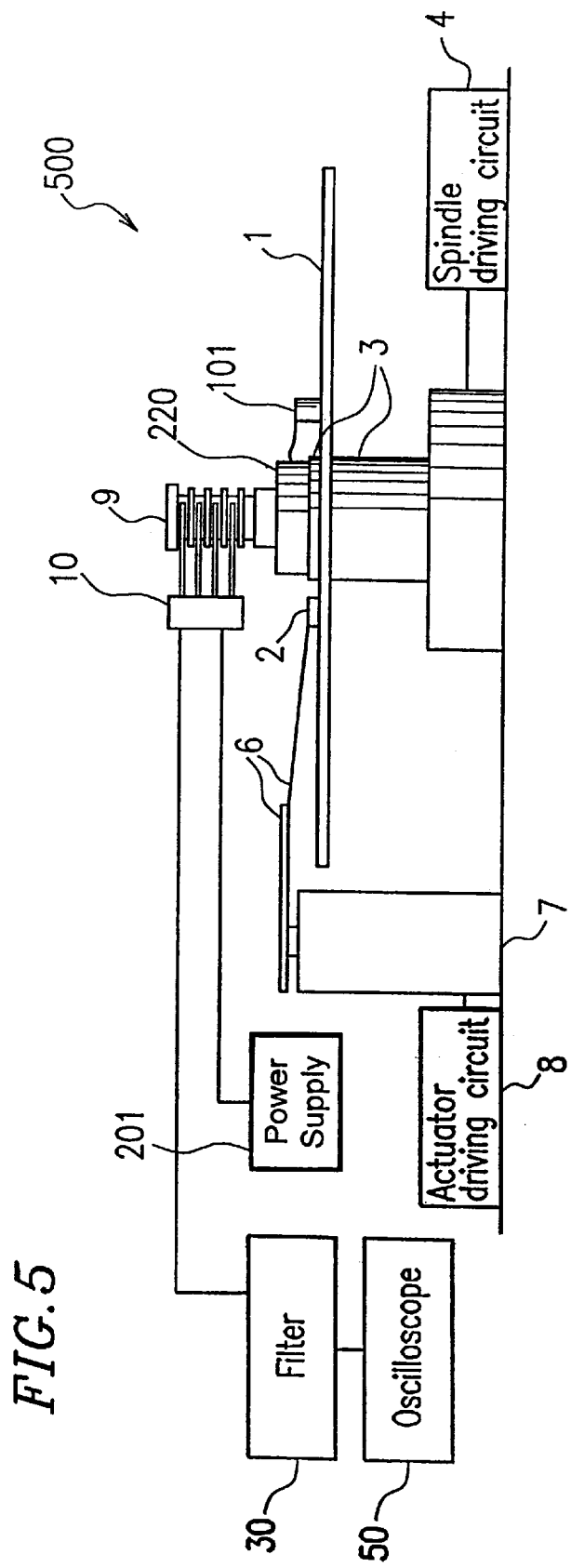
FIG. 5 is a block diagram illustrating a contact tester of Embodiment 5 according to the present invention.

FIG. 5 illustrates a contact tester 500 of Embodiment 5 according to the present invention. In FIG. 5, components corresponding to those in FIG. 1A are denoted by the same reference numerals.

Referring to FIG. 5, a magnetic disk 1 as a recording medium and a slider 2 together with an arm 6 supporting the slider 2 are mounted to the contact tester 500. The slider 2 is provided with a magnetic head (not shown) for recording/reproducing information on/from the magnetic disk 1. The contact tester 500 includes: a spindle 3 as a holding mechanism for holding and rotating the magnetic disk 1; a spindle driving circuit 4 for driving the spindle 3; a voice coil motor 7 as an actuator for moving the arm 6 and thereby moving the slider 2 attached to the arm 6 in a radial direction of the magnetic disk 1; and an actuator driving circuit 8 for driving the voice coil motor 7. The contact tester 500 further includes an acoustic emission (AE) sensor 101 as a micro-vibration detection element mounted on the magnet disk 1 for detecting a contact between the slider 2 and the magnetic disk 1. The AE sensor 101 is composed of a piezoelectric element (PZT), for example, and can detect a very minute vibration.

The contact tester further includes: a high bandwidth amplifier 220 mounted on the spindle 3 for amplifying an output signal of the AE sensor 101; a power supply 201 for supplying electric power to the high bandwidth amplifier 220; a filter 30 for filtering out a frequency component required for the contact test from an output signal from the high bandwidth amplifier 220; and an oscilloscope 50 for displaying an output signal from the filter 30.

The spindle 3 is provided with a signal transmission means for transmitting the output signal of the AE sensor 101 amplified by the high bandwidth amplifier 220. Such a signal transmission means includes a rotary conductor 9 which is secured to the spindle 3 and rotates with the rotation of the spindle 3 and a contact conductor 10 which is in contact with the rotary conductor, for transmitting the output signal of the AE sensor 101, as well as electric power supplied from the power supply 201 to the high bandwidth amplifier 220. In this embodiment shown in FIG. 5, a slip ring 9 is used as the rotary conductor and a brush 10 is used as the contact conductor.

More specifically, the magnetic disk 1 is secured to the spindle 3 with a screw, for example. A DC servo motor is used for driving the spindle 3, which is set so that the magnetic disk 1 can be rotated at a constant speed in the range of 0 to about 10,000 rpm. A hydrodynamic bearing, which is to be described hereinbelow, is used as a bearing of the spindle 3. The slider 2 provided with a magnetic head (not shown) is attached to the arm 6. The slider 2 has an air bearing surface on the side facing a recording/reproduction surface of the magnetic disk 1. The air bearing surface, which is formed by mechanical processing or etching, is pressed against the recording/reproduction surface of the magnetic disk 1 by the arm 6 with a constant load of 30 mN, for example. When the magnetic disk 1 is rotated, a pressure is generated on the air bearing surface of the slider 2 by the rotation of the magnetic disk 1, allowing the slider 2 to float above the magnetic disk 1. The arm 6 is attached to the voice coil motor 7 as an actuator, and swings around an axis of the voice coil motor 7, as the voice coil motor 7 swings, allowing the slider 2 attached to the arm 6 to move in a radial direction of the magnetic disk 1. The AE sensor 101 is mounted on the recording/reproduction surface of the magnetic disk 1 as a micro-vibration detection element.

The function of the contact tester 500 of this embodiment will be described. When the slider 2 comes into contact with the magnetic disk 1 for some reason, acoustic emission (AE) or acoustic stress wave is generated at the contact point. The AE sensor 101 detects the AE or the acoustic stress wave and converts it into an electrical signal.

The output signal of the AE sensor 101 is first amplified by the high bandwidth amplifier 220 mounted on the spindle 3 to a level durable for transmission. The power supply 201 for the high bandwidth amplifier 220 is a DC power supply with a voltage of 15 V. An output signal from the high bandwidth amplifier 220 is guided by the slip ring 9 and the brush 10 as the signal transmission means, to be retrieved outside. The retrieved output signal is then filtered by the filter 30 to obtain only a frequency component required for observation. The filtered output signal of the AE sensor 101 is observed on the oscilloscope 50 as a display means. From a signal waveform observed on the oscilloscope 50, the strength, duration, and the like of the contact between the slider 2 and the magnetic disk 1 can be evaluated.

In this embodiment, the AE sensor 101 was used as the micro-vibration detection element. Other elements which can detect minute vibration generated by a contact between the slider 2 and the magnetic disk 1, such as an acceleration sensor and a distortion gauge, can also be used. In this embodiment, only one AE sensor was used. Alternatively, a plurality of AE sensors may be mounted on the magnetic disk 1. In this case, however, a plurality of high bandwidth amplifiers are required. In this embodiment, a hydrodynamic bearing was used as the bearing of the spindle 3. This is because, if a contact type bearing such as a ball bearing is used, the vibration generated by such a bearing is also detected by the AE sensor 101, degrading the S/N ratio at the detection of the contact between the slider 2 and the magnetic disk 1. If a sufficiently good S/N ratio can be ensured, any bearing may be used.

With the above configuration of the contact tester of Embodiment 5, a minute signal of the AE sensor 101 is amplified sufficiently before being transmitted through the slip ring 9 and the brush 10. Accordingly, a reduction in S/N ratio of the signal from the AE sensor 101 can be suppressed, and thus high precision of the contact test can be maintained.

Embodiment 6

Figure 6:
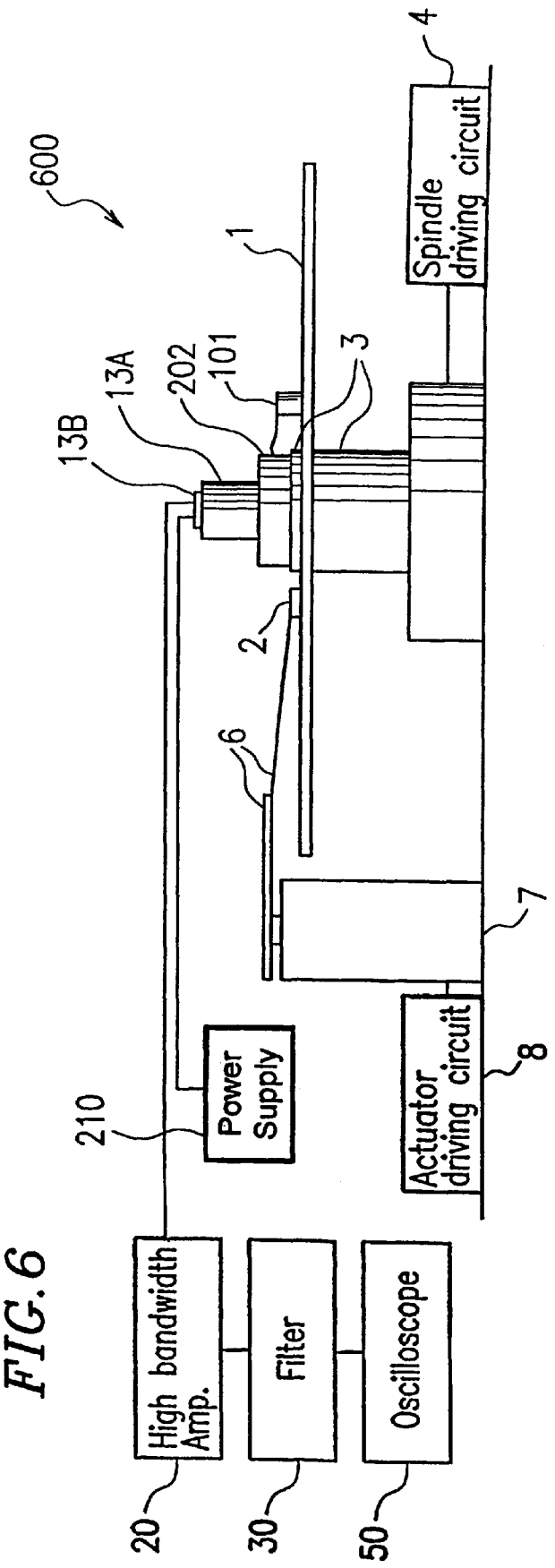
FIG. 6 is a block diagram illustrating a contact tester of Embodiment 6 according to the present invention.

FIG. 6 illustrates a contact tester 600 of Embodiment 6 according to the present invention. In this embodiment, description of portions of the configuration similar to those of Embodiment 5 is omitted.

In Embodiment 5, an output signal of the AE sensor 101 mounted on the magnetic disk 1 was retrieved outside by use of the slip ring 9 and the brush 10 as a signal transmission means. In Embodiment 6, as in Embodiment 3, a rotational transformer 13A as a signal transmitter and a fixed transformer 13B as a signal receiver are used as a non-contact signal transmission means for the AE sensor 101 mounted on the magnetic disk 1. The rotational transformer 13A is secured to the spindle 3 to be rotated with the rotation of the spindle 3 and transmits a signal through the air. The fixed transformer 13B receives the signal transmitted by the rotational transformer 13A.

The contact tester 600 of Embodiment 6 uses an impedance converter 202 mounted on the spindle 3 for converting an output impedance of the AE sensor 101, in place of the high bandwidth amplifier 220 in Embodiment 5. A power supply 210 supplies electric power to the AE sensor 101 and the impedance converter 202 via the non-contact transmission between the rotational transformer 13A and the fixed transformer 13B.

The power supply 210 is an AC power supply. A rectifying circuit is provided at a power input stage of the impedance converter 202. The frequency characteristics of the rotational transformer 13A and the fixed transformer 13B are in a close relationship with the impedances thereof. As the impedance of the transformer becomes higher, a high frequency less easily passes through the transformer. Accordingly, the impedances of the rotational transformer 13A and the fixed transformer 13B are preferably made small.

As the impedance of a transformer is made small, however, such a small impedance does not match with the output impedance of the AE sensor 101 which is as high as several tens of kilohms, reducing the transmission efficiency.

In order to solve this problem, the output impedance of the AE sensor 101 is converted by the impedance converter 202 to match with the impedance of the transformers. By this conversion, a sufficiently large output signal for the contact detection can be retrieved even when the output signal is transmitted via the rotational transformer 13A and the fixed transformer 13B. In this embodiment, the output signal converted by the impedance converter 202 is amplified by the high bandwidth amplifier 20.

In this way, non-contact transmission over a wide range of frequencies is possible by use of the rotational transformer 13A and the fixed transformer 13B together with the impedance converter 202. This enables to maintain high precision of the contact test. By providing a field effect transistor at an input stage of the impedance converter 202, the impedance of the transformers can match with the output impedance of the AE sensor 101 which is as high as 10 kilohms or more.

The high bandwidth amplifier 220 in Embodiment 5 may be replaced with the impedance converter 202. Likewise, the impedance converter 202 in Embodiment 6 may be replaced with the high bandwidth amplifier 220.

Embodiment 7

Figure 7:
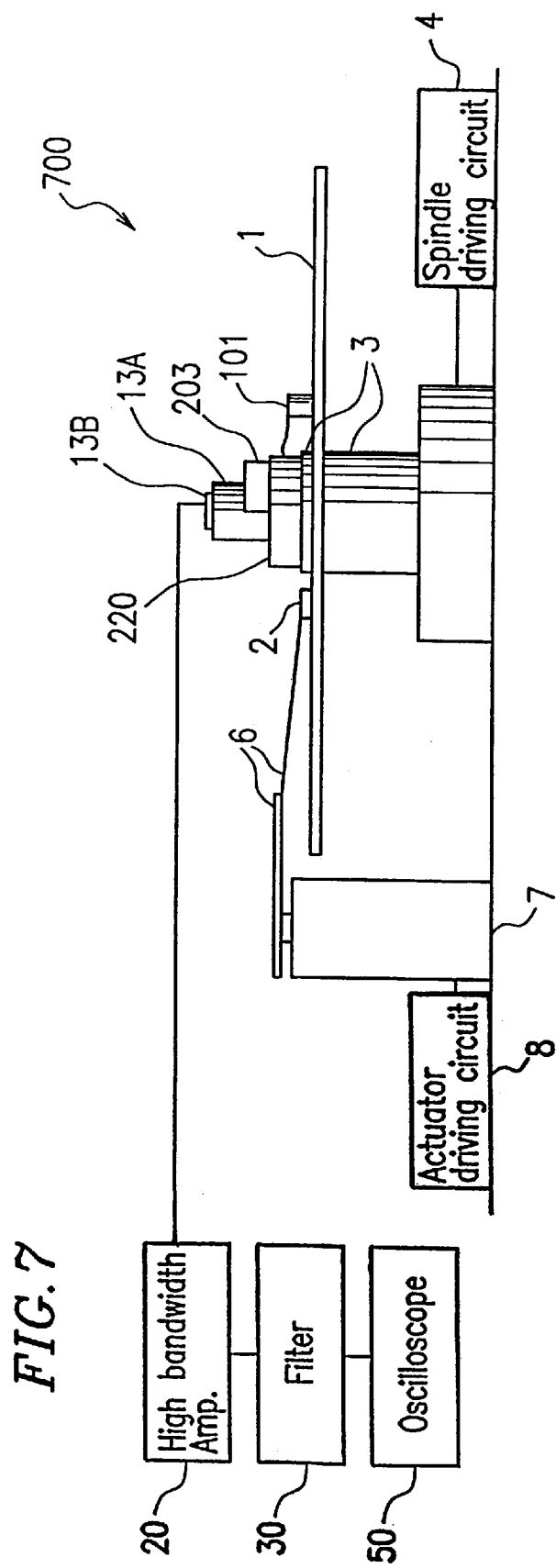
FIG. 7 is a block diagram illustrating a contact tester of Embodiment 7 according to the present invention.

FIG. 7 illustrates a contact tester 700 of Embodiment 7 according to the present invention. In this embodiment, description of portions of the configuration similar to those of Embodiments 5 and 6 is omitted.

In Embodiments 5 and 6, the high bandwidth amplifier 220 and the impedance converter 202 were supplied with power by the power supplies 201 and 210, respectively. Such external power supplies require a means for transmitting the power to the high bandwidth amplifier 220 and the impedance converter 202. In these embodiments, the signal transmission means such as the combination of the slip ring 9 and the brush 10 or the combination of the rotational transformer 13A and the fixed transformer 13B, which were used for transmitting an output signal of the AE sensor 101, were also used for transmitting the power. With this configuration, power supply noise may be superimposed on the signal transmitted. In order to solve this problem, in Embodiment 7, a battery 203 is mounted on the spindle 3, to eliminate the necessity of using an external power supply. FIG. 7 illustrates an example of application of this configuration to the contact tester of Embodiment 6. This can also be applied to the contact tester of Embodiment 5.

Embodiment 8

FIG. 8A illustrates a contact tester 800 of Embodiment 8 according to the present invention. FIG. 8B is an enlarged sectional view of portion A of FIG. 8A. In this embodiment, portions of the configuration similar to those of Embodiment 1 is omitted.

Referring to FIG. 8A, a magnetic disk 1 as a recording medium and a slider 2 together with an arm 6 supporting the slider 2 are mounted to the contact tester 800. The slider 2 is provided with a magnetic head (not shown) for recording/reproducing information on/from the magnetic disk 1. The contact tester 800 includes: a spindle 803A as a holding mechanism for holding and rotating the magnetic disk 1 in an integral manner; a clamp member 803B for securing the magnetic disk 1 to the spindle 803A; a spindle driving circuit 4 for driving the spindle 803A; a voice coil motor 7 as an actuator for moving the arm 6 and thereby moving the slider 2 attached to the arm 6 in a radial direction of the magnetic disk 1; and an actuator driving circuit 8 for driving the voice coil motor 7. The contact tester 800 further includes: an acoustic emission (AE) sensor 101 as a micro-vibration detection element mounted in the spindle 803A; a high bandwidth amplifier 20 for amplifying an output signal from the AE sensor 101, a filter 30 for filtering out a frequency component required for the contact test from an output signal from the high bandwidth amplifier 20; and an oscilloscope 50 for displaying an output signal from the filter 30. The contact tester 800 of this embodiment additionally includes a slip ring 9 as a rotary conductor and a brush 10 as a contact conductor. A spring 204 presses the AE sensor 101 against the magnetic disk 1.

More specifically, the magnetic disk 1 is screwed, for example, to the spindle 803A with the clamp member 803B. Before the magnetic disk 1 is secured to the spindle 803A, a detection section 101A of the AE sensor 101 extrudes from the top surface of the spindle 803A due to the spring 204 which is in the expanded state to its natural length. When the magnetic disk 1 is pressed down by the clamp member 803B to be secured to the spindle 803A, the spring 204 is compressed and the detection section 101A of the AE sensor 101 is pressed by the magnetic disk 1 with a constant force.

With the above configuration, the contact state between the AE sensor 101 and the magnetic disk 1 can be kept constant even if the magnetic disk 1 is exchanged with another one. This improves the reproducibility of the contact test. Moreover, since an adhesive and the like are not used, the magnetic disk 1 is free from being damaged.

Embodiment 9

Figure 9:
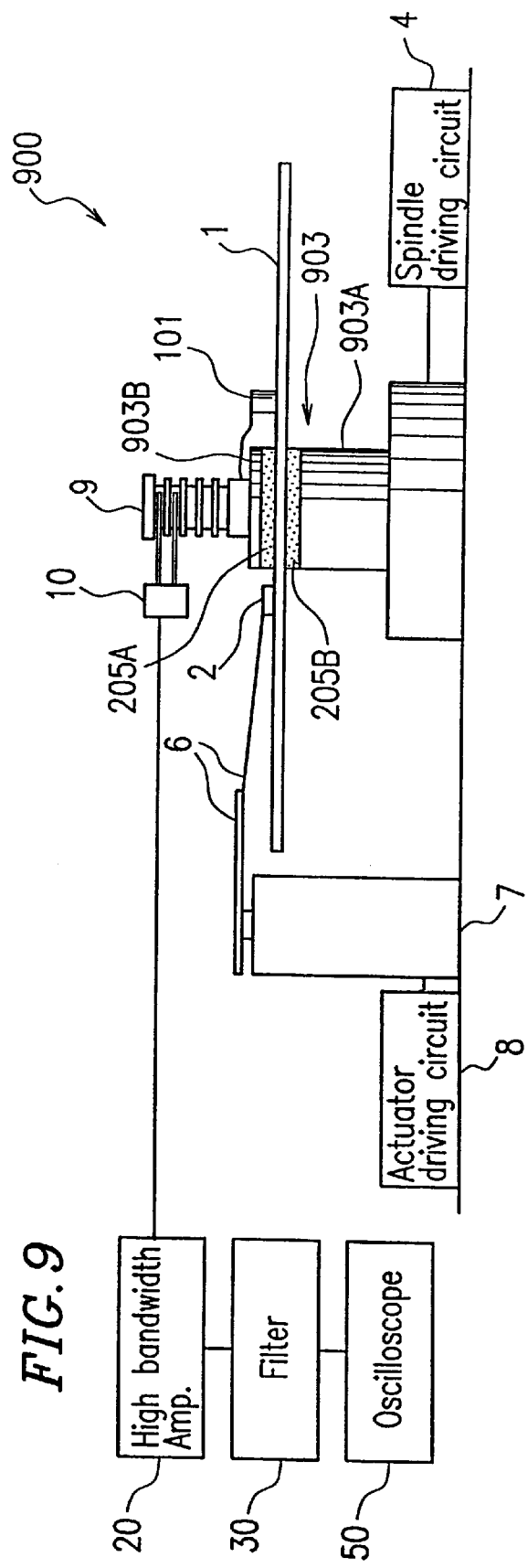
FIG. 9 is a block diagram illustrating a contact tester of Embodiment 9 according to the present invention.

FIG. 9 illustrates a contact tester 900 of Embodiment 9 according to the present invention. In this embodiment, description of portions of the configuration similar to those of Embodiment 1 is omitted.

Referring to FIG. 9, a magnetic disk 1 as a recording medium and a slider 2 together with an arm 6 supporting the slider 2 are mounted to the contact tester 900. The slider 2 is provided with a magnetic head (not shown) for recording/reproducing information on/from the magnetic disk 1. The contact tester 900 includes: a spindle 903A as a holding mechanism for holding and rotating the magnetic disk 1; a clamp member 903B for securing the magnetic disk 1 to the spindle 903A; a spindle driving circuit 4 for driving the spindle 903A; a voice coil motor 7 as an actuator for moving the arm 6 and thereby moving the slider 2 attached to the arm 6 in a radial direction of the magnetic disk 1; and an actuator driving circuit 8 for driving the voice coil motor 7. The contact tester 900 further includes: an acoustic emission (AE) sensor 101 as a micro-vibration detection element mounted on the magnetic disk 1; a high bandwidth amplifier 20 for amplifying an output signal from the AE sensor 101, a filter 30 for filtering out a frequency component required for the contact test from an output signal from the high bandwidth amplifier 20; and an oscilloscope 50 for displaying an output signal from the filter 30. The contact tester 900 of this embodiment further includes a slip ring 9 as a rotary conductor and a brush 10 as a contact conductor.

Silicone rubber members 205A and 205B are provided as acoustic blocking members for isolating the magnetic disk 1 from the spindle 903A and the clamp member 903B with respect to the propagation of vibration.

More specifically, if the silicone rubber members 205A and 205B are not provided, vibration caused by sliding between the slip ring 9 and the brush 10 or vibration generated in a bearing of the spindle 903A and the like is detected by the AE sensor 101 by being superimposed on the vibration generated by a contact between the slider 2 and the magnetic disk 1. This reduces the precision of the test of the contact between the slider 2 and the magnetic disk 1.

This problem can be solved by providing the silicone rubber members 205A and 205B as the vibration isolators as described above, preventing the precision of the contact test from reducing. Moreover, the silicone rubber members 205A and 205B can protect the magnetic disk 1 from being damaged when the magnetic disk 1 is held by the spindle 903A and the clamp member 903B. The acoustic blocking material is not limited to silicone rubber, but any material which can block sound may be used to provide the same effect.

The configurations of Embodiments 8 and 9 may also be applied to the contact test apparatuses of Embodiments 5 to 7.

Embodiment 10

Figure 10:
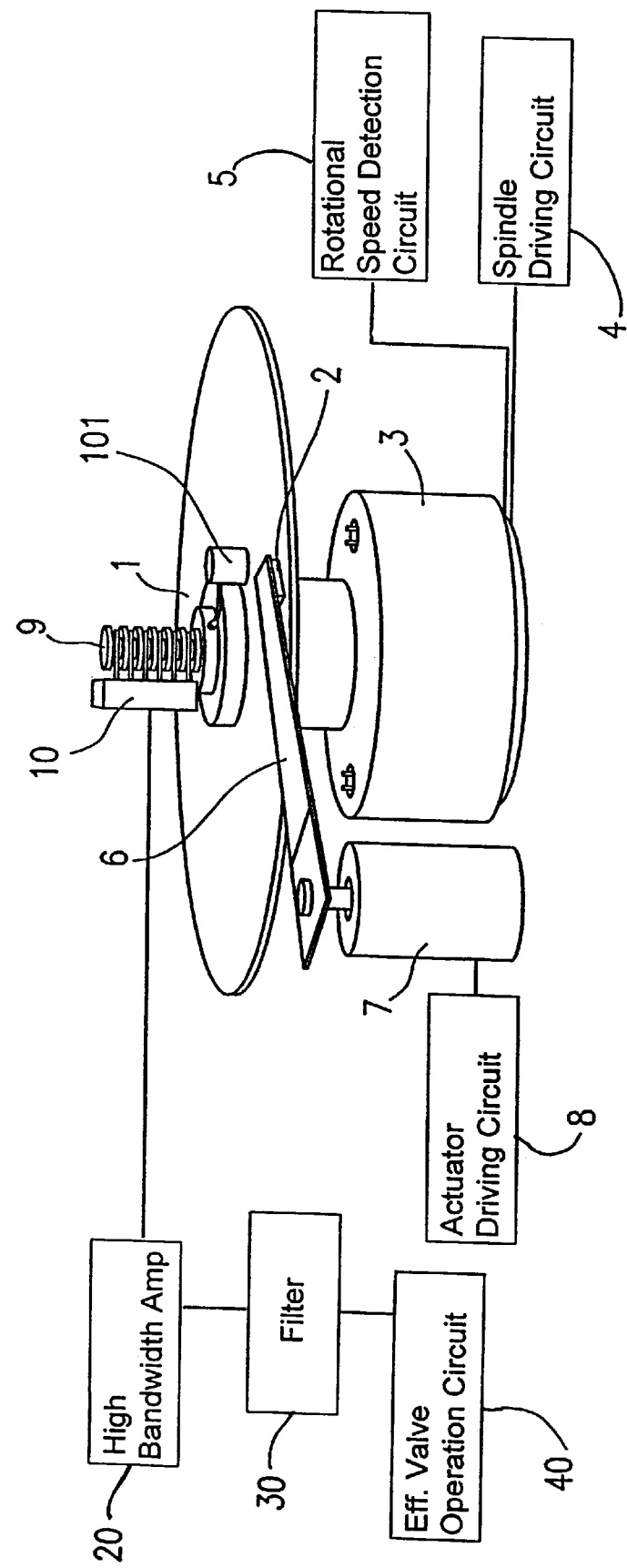
FIG. 10 is a block diagram illustrating a first example of a contact tester of Embodiment 10 according to the present invention.

FIG. 10 illustrates a contact tester 1000 of a first example of Embodiment 10 according to the present invention. In this embodiment, portions of the configuration similar to those of Embodiment 1 is omitted.

Referring to FIG. 10, a magnetic disk 1 as a recording medium and a slider 2 together with an arm 6 supporting the slider 2 are mounted to the contact tester 1000. The slider 2 is provided with a magnetic head (not shown) for recording/reproducing information on/from the magnetic disk 1. The contact tester 1000 includes: a spindle 3 as a holding mechanism for holding and rotating the magnetic disk 1 in an integral manner; a spindle driving circuit 4 for driving the spindle 3; a rotational speed detection circuit 5 for detecting the rotational speed of the spindle 3; a voice coil motor 7 as an actuator for moving the arm 6 and thereby moving the slider 2 attached to the arm 6 substantially in a radial direction of the magnetic disk 1; and an actuator driving circuit 8 for driving the voice coil motor 7. The contact tester 1000 further includes: an acoustic emission (AE) sensor 101 as a micro-vibration detection element mounted on the magnetic disk 1 for detecting an AE signal or an acoustic stress wave signal generated by a contact between the slider 2 and the magnetic disk 1; a combination of a slip ring 9 and a brush 10 as a signal transmission means; a high bandwidth amplifier 20 for amplifying an output signal of the AE sensor 101; a filter 30 for filtering out a frequency component required for the measurement of a normal force from an output signal from the high bandwidth amplifier 20; and an effective value operation circuit 40 for operating an effective value voltage from an output signal from the filter circuit 30.

Figure 11:
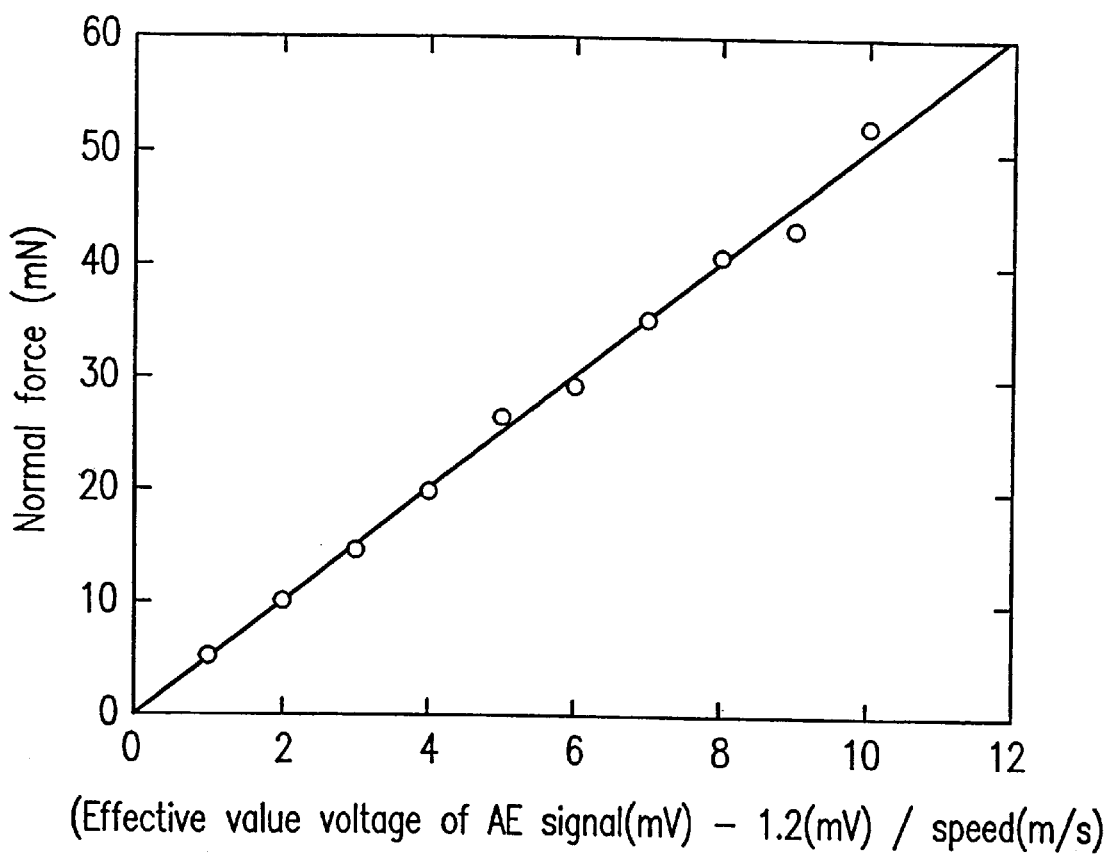
FIG. 11 is a graph showing the relationship among the effective value of an output voltage of an AE sensor, the relative speed between a slider and a magnetic disk, and the normal force between the slider and the magnetic disk for the contact tester of Embodiment 10.

FIG. 11 is a graph showing the relationship among the effective value of a signal voltage of the AE sensor 101 obtained from the operation by the effective value operation circuit 40, the relative speed between the slider 2 and the magnetic disk 1, and the normal force between the slider 2 and the magnetic disk 1.

More specifically, the magnetic disk 1 is made of aluminum having an outer diameter of 95 mm, an inner diameter of 25 mm, and a thickness of 0.8 mm, for example. Magnetic layers made of cobalt as a main component are formed on both surfaces of the magnetic disk 1 by evaporation. The magnetic disk 1 is secured to the spindle 3 with a screw, for example.

Figure 12:
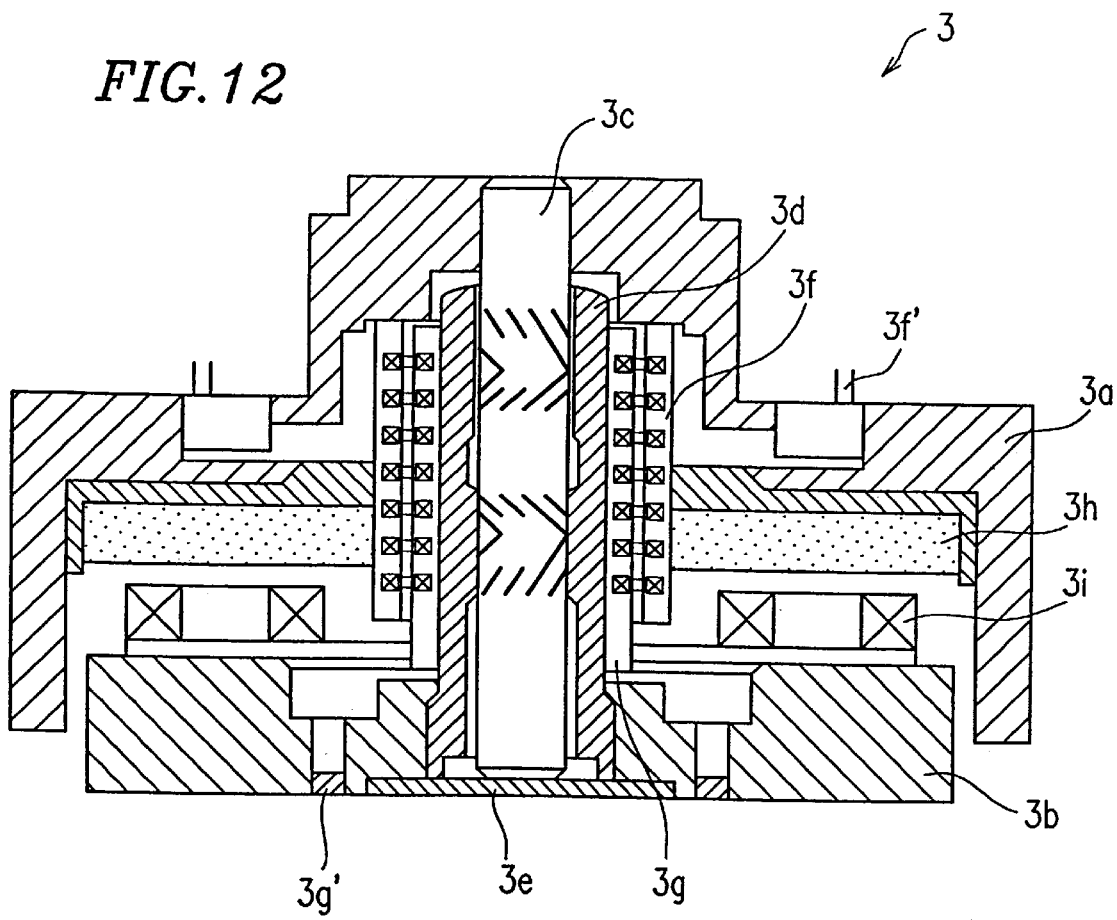
FIG. 12 is a sectional view of a spindle of the contact tester of Embodiment 10.

Referring to FIG. 12, the configuration of the spindle 3 will be described. The spindle 3 includes a rotor 3a, a stator 3b, a shaft 3c, a radial bearing 3d, a thrust bearing 3e, rotary transformers 3g and 3f, rotary transformer terminals 3g' and 3f', a permanent magnet 3h, and a coil 3i. A groove is formed on the shaft 3c and the thrust bearing 3e, so as to provide a hydrodynamic bearing with oil filled in a bearing portion. The shaft 3c, the radial bearing 3d, and the thrust bearing 3e are kept in non-contact state among one another by a dynamic pressure of oil generated by the rotation.

The use of such a hydrodynamic bearing effectively avoids sliding between the rotor 3a and the stator 3b when the spindle 3 rotates, unlike the case of a contact type bearing using a ball bearing and the like. By using the rotary transformers 3g and 3f, an electrical signal can be retrieved from the rotor 3a outside the rotating body in a non-contact manner.

The slider 2 provided with a magnetic head (not shown) and attached to the arm 6 is made of a ceramic material such as $Al_2O_3$—TiC, for example. The surface of the slider 2 facing the magnetic disk 1 is an air bearing surface formed by mechanical processing or etching. The AE sensor 101 mounted on a recording/reproduction surface of the magnetic disk 1 is a sensor which outputs acoustic emission (AE) or acoustic stress wave as an electrical sign al representing a displacement in a detection portion. The AE sensor 101 is composed of a piezoelectric element (PZT), for example. Thus, by mounting the AE sensor 101 on the magnetic disk 1, AE generated when the slider 2 comes into contact with and slides on the magnetic disk 1 can be detected.

The operation of the contact tester 1000 will be described. The air bearing surface of the slider 2 is pressed against the recording/reproduction surface of the magnetic disk 1 with a constant load of 30 mN, for example, by the arm 6 having a spring property in the direction of pressing the slider 2 toward the magnetic disk 1. The arm 6 is attached to the voice coil motor 7 as an actuator. The voice coil motor 7 swings around the axis thereof over a predetermined angular range such as 30°. With the swinging of the voice coil motor 7, the arm 6 swings above the recording/reproduction surface of the magnetic disk 1 substantially in parallel with the magnetic disk 1. With the swinging of the arm 6, the slider 2 attached to the arm 6 moves above the magnetic disk 1 substantially in a radial direction of the magnetic disk 1.

The spindle 3 rotates at a speed in the range of about 900 rpm to about 2000 rpm by activating the coil 3i. The magnetic disk 1 rotates integrally with the spindle 3. The speed of the rotation of the magnetic disk 1 is always detected by the rotational speed detection circuit 5 which counts the number of pulses of the signal sent from an MR element (not shown) mounted on the spindle 3. When the magnetic disk 1 rotates, air flows to the air bearing surface of the slider 2, generating a pressure exceeding the load pressing the slider 2 and thus allowing the slider 2 to float above the magnetic disk 1.

Otherwise, when the magnetic disk 1 just starts rotating or is not rotating, the slider 2 is in contact with the magnetic disk 1 since no or little pressure is generated at the air bearing surface of the slider 2. When the slider 2 comes into contact with the magnetic disk 1, acoustic emission (AE) or acoustic stress wave is generated at the contact point. The AE sensor 101 detects the AE and converts the AE into an electrical signal based on a displacement in a detection portion. The resultant electrical signal is as faint as several tens to several hundreds of microvolts, but includes information relating to a contact generated between the slider 2 and the magnetic disk 1.

The output signal of the AE sensor 101 is transmitted to the slip ring 9 which is connected to the output terminal of the AE sensor 101 and then to the brush 10 to be retrieved outside the rotating body. The output signal of the AE sensor 101 is then amplified by the high bandwidth amplifier 20 by about 40 dB to about 60 dB, to obtain a voltage sufficiently large for the operation of an effective value voltage. As the high bandwidth amplifier 20, an amplifier having a frequency range of 100 Hz to 10 MHz, for example, is used. Using such an amplifier, the AE signal can be amplified without any damage since the frequency of the AE signal is of the order of several tens of kilohertz to several megahertz. The resultant output signal amplified by the high bandwidth amplifier 20 is filtered by the filter circuit 30 to remove an unnecessary frequency component lower than a cut-off frequency of 100 KHz, for example. The output signal filtered out by the filter circuit 30 is then subjected to the operation by the effective value operation circuit 40 to obtain an effective value voltage of the output signal.

Simultaneously with the detection of the contact, the relative speed between the slider 2 and the magnetic disk 1 is determined based on the distance of the slider 2 from the rotational center of the spindle 3 and the rotational speed of the magnetic disk 1 detected by the rotational speed detection circuit 5. The inventors of the prevent invention have found that the effective value of the signal voltage of the AE sensor 101, the relative speed between the slider 2 and the magnetic disk 1, and the normal force between the slider 2 and the magnetic disk 1 have a relationship as shown in FIG. 11. The value of 1.2 mV subtracted from the effective value of the AE signal voltage in the expression shown in FIG. 11 represents noise of the measurement system detected by the AE sensor 101 when the slider 2 is not in contact with the magnetic disk 1.

The above relationship diagram is prepared in advance, so that the normal force acting between the slider 2 and the magnetic disk 1 can be obtained from the effective value of the output voltage of the AE sensor 101 and the relative speed between the slider 2 and the magnetic disk 1 which are obtained as described above.

Figure 13:
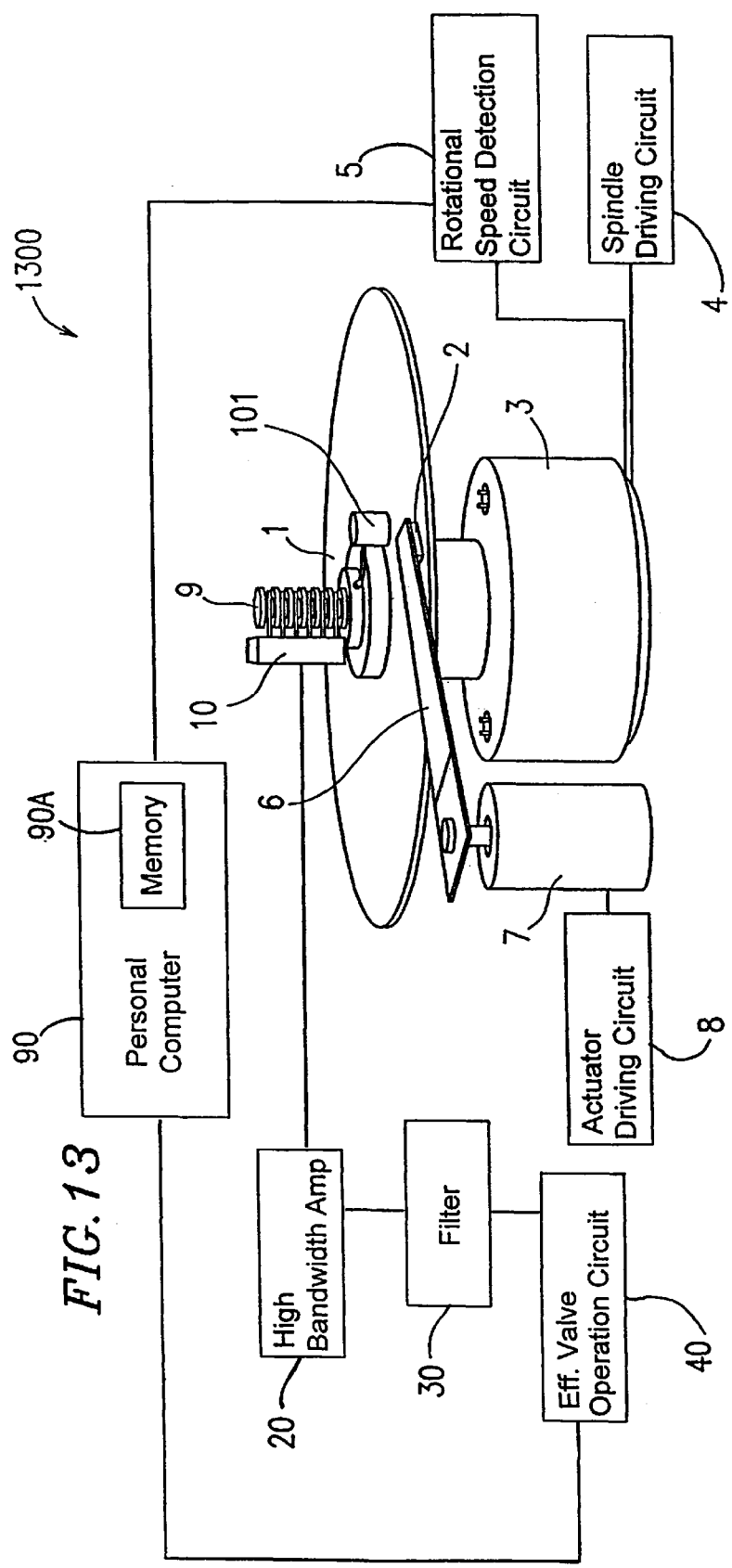
FIG. 13 is a block diagram illustrating a second example of the contact tester of Embodiment 10 according to the present invention.

FIG. 13 illustrates a contact tester 1300 of a second example of Embodiment 10. In the second example, portions of the configuration similar to those of the first example is omitted.

Referring to FIG. 13, a personal computer 90 is provided, which automatically calculates the normal force between the slider 2 and the magnetic disk 1 based on an expression stored in a memory 90A representing the relationship among the effective value of the output voltage of the AE sensor 101, the relative speed between the slider 2 and the magnetic disk 1, and the normal force between the slider 2 and the magnetic disk 1, the effective value of the detected output voltage of the AE sensor 101, and the relative speed between the slider 2 and the magnetic disk 1. The relationship as shown in FIG. 11, for example, is pre-stored in the memory 90A as an expression. The personal computer 90 is connected to the outputs of the rotational speed detection circuit 5 and the effective value operation circuit 40. The relative speed between the slider 2 and the magnetic disk 1 is calculated based on the rotational speed of the magnetic disk 1 output from the rotational speed detection circuit 5 and the position of the slider 2 above the magnetic disk 1 in a radial direction of the magnetic disk 1 (pre-stored in the memory 90A of the personal computer 90). The effective value of the output voltage of the AE sensor 101 is obtained from the effective value operation circuit 40. Based on the above information, the normal force between the slider 2 and the magnetic disk 1 can be automatically calculated in accordance with a predetermined program.

Thus, in the second example described above, in addition to obtaining the same effect as that described in the first example of Embodiment 10, the normal force can be efficiently determined without the necessity of reading a value from the relationship diagram. The relationship among the effective value of the output voltage of the AE sensor, the relative speed between the slider and the magnetic disk, and the normal force between the slider and the magnetic disk is generally represented by:

$$V = \alpha(Nv)^{0.5} + \beta$$

wherein V denotes the effective value of the output voltage of the AE sensor, v denotes the relative speed between the slider and the magnetic disk, N denotes the normal force between the slider and the magnetic disk, $\alpha$ and $\beta$ denote constants. This is described in Japanese Laid-Open Publication No. 9-43130 by the same inventors as those of the present invention. Although a large amount of data were used to obtain the relationship diagram shown in FIG. 11, it should be understood that a relationship diagram or expression with sufficiently high precision can be obtained from a smaller amount of data by using the relationship described above.

Figure 14:
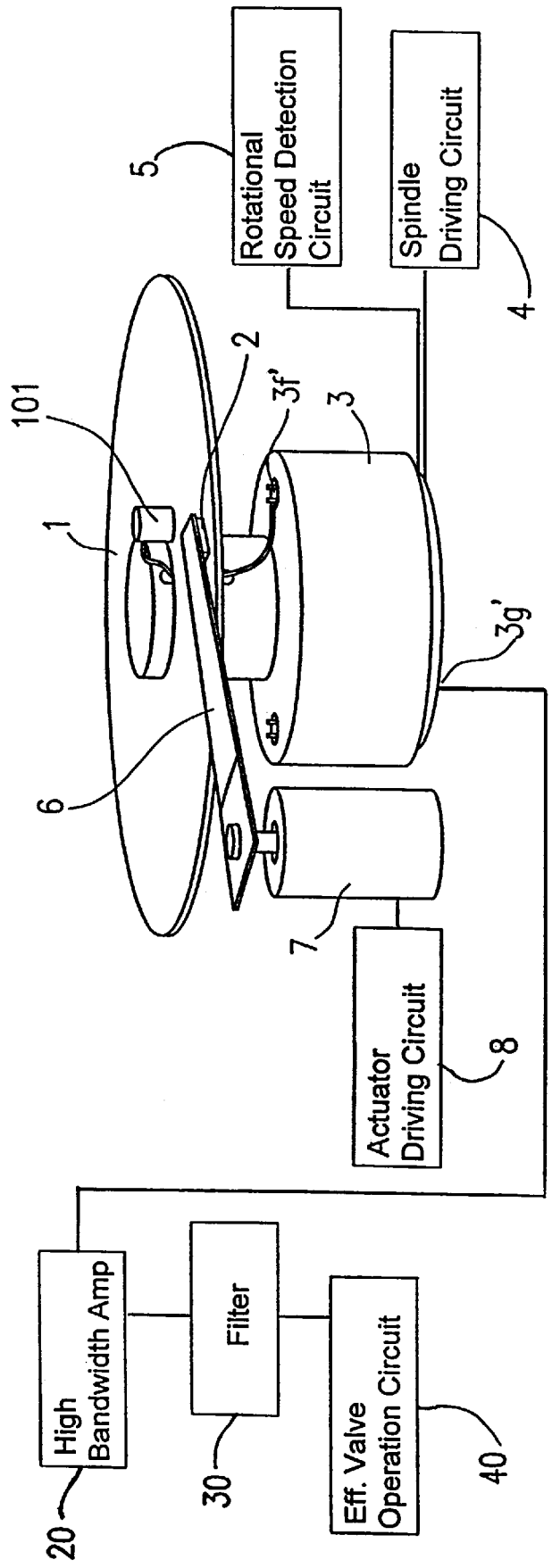
FIG. 14 is a block diagram illustrating an alternative of the first example of the contact tester of Embodiment 10 according to the present invention.

In Embodiment 10, since the AE sensor 101 is mounted on the magnetic disk 1, not on the arm as in the conventional apparatus, the detection results are not influenced by a vibration of the arm and the inertia of the AE sensor. This enables to determine the normal force between the slider and the magnetic disk with high precision. In Embodiment 10, the output signal of the AE sensor 101 was retrieved outside the rotating body via the slip ring 9 and the brush 10. As an alternative example, as shown in FIG. 14, the signal may also be retrieved outside the rotating body in a non-contact manner using the rotary transformers 3f and 3g (see FIG. 12) mounted in the spindle 3 by connecting the terminal 3f' of the transmitter 3f to the output terminal of the AE sensor 101 and connecting the terminal 3g' of the rotary transformer 3g to the input terminal of the high bandwidth amplifier 20. This configuration is advantageous in that mechanical noise which would otherwise be generated by sliding contact between the slip ring 9 and the brush 10 is not generated to be superimposed on the signal from the AE sensor 101, realizing a contact test with higher precision.

Embodiment 11

Figure 15:
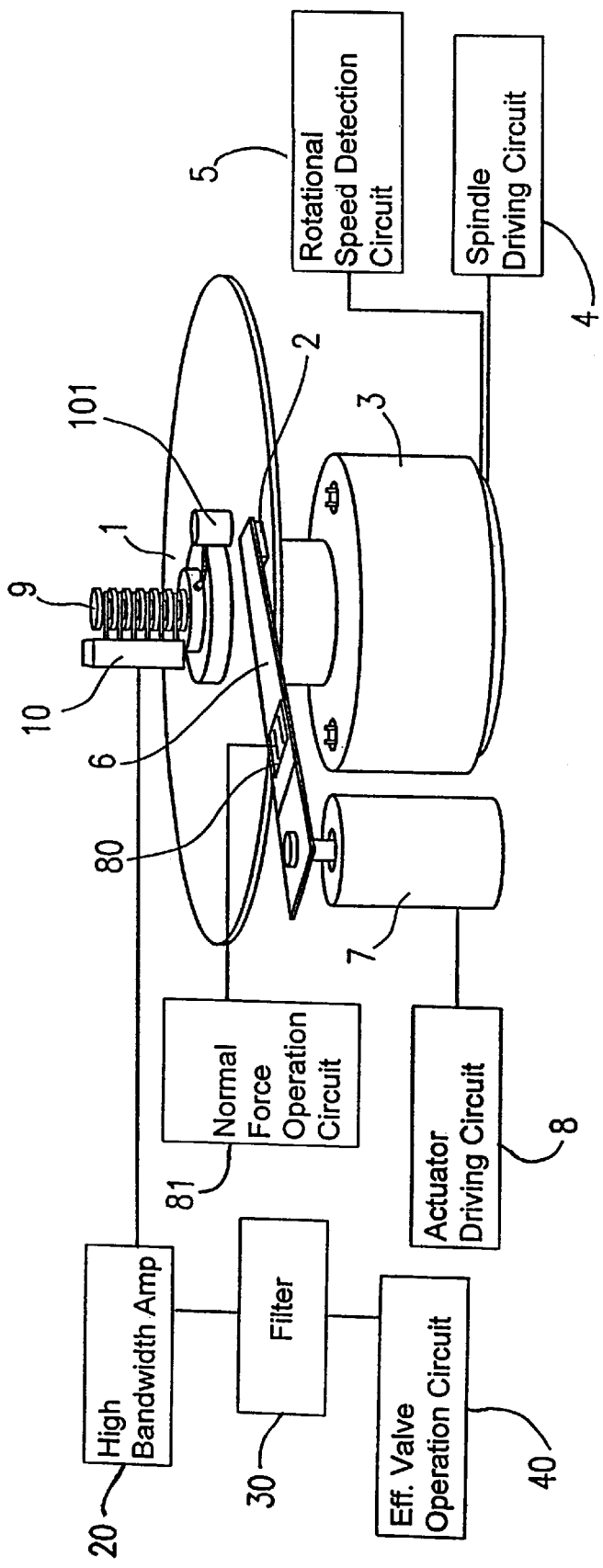
FIG. 15 is a block diagram illustrating a first example of a contact tester of Embodiment 11 according to the present invention.

FIG. 15 illustrates a contact tester 1500 of a first example of Embodiment 11 according to the present invention. In this embodiment, portions of the configuration similar to those of Embodiment 10 is omitted.

Referring to FIG. 15, a distortion detection element 80, such as a distortion gauge, and a normal force operation circuit 81 constitute a normal force detection means. The normal force operation circuit 81 calculates the normal force between the slider 2 and the magnetic disk 1 based on an output from the distortion detection element 80, and is composed of a Wheatstone bridge and a dynamic distortion amplifier if a distortion gauge is used as the distortion detection element 80. With this configuration, the normal force between the slider 2 and the magnetic disk 1 is always detectable.

In Embodiment 10, the calculation of the normal force between the slider 2 and the magnetic disk 1 based on the effective value of the observed signal voltage of the AE sensor 101 with high precision was an object of the invention. On the contrary, in Embodiment 11, it is an object of the invention to detect the magnitude of the abrasion of the slider 2 from the effective value of the signal voltage of the AE sensor 101. As described in Embodiment 10, when the magnetic disk 1 just starts rotating or is not rotating, the slider 2 is in contact with the magnetic disk 1 since no or little pressure is generated at the air bearing surface of the slider 2. Therefore, both the slider 2 and the magnetic disk 1 gradually abrade as the magnetic disk 1 repeatedly starts and stops rotating. This abrasion has a very close relationship with the durability of reliability of the magnetic disk device. Measurement of the abrasion of the slider 2 is therefor very important. The inventors have found that the effective value of the signal voltage of the AE sensor 101, the relative speed between the slider 2 and the magnetic disk 1, the normal force between the slider 2 and the magnetic disk 1, and the abrasion coefficient of the slider 2 have the relationship as shown in FIG. 16.

Figure 16:
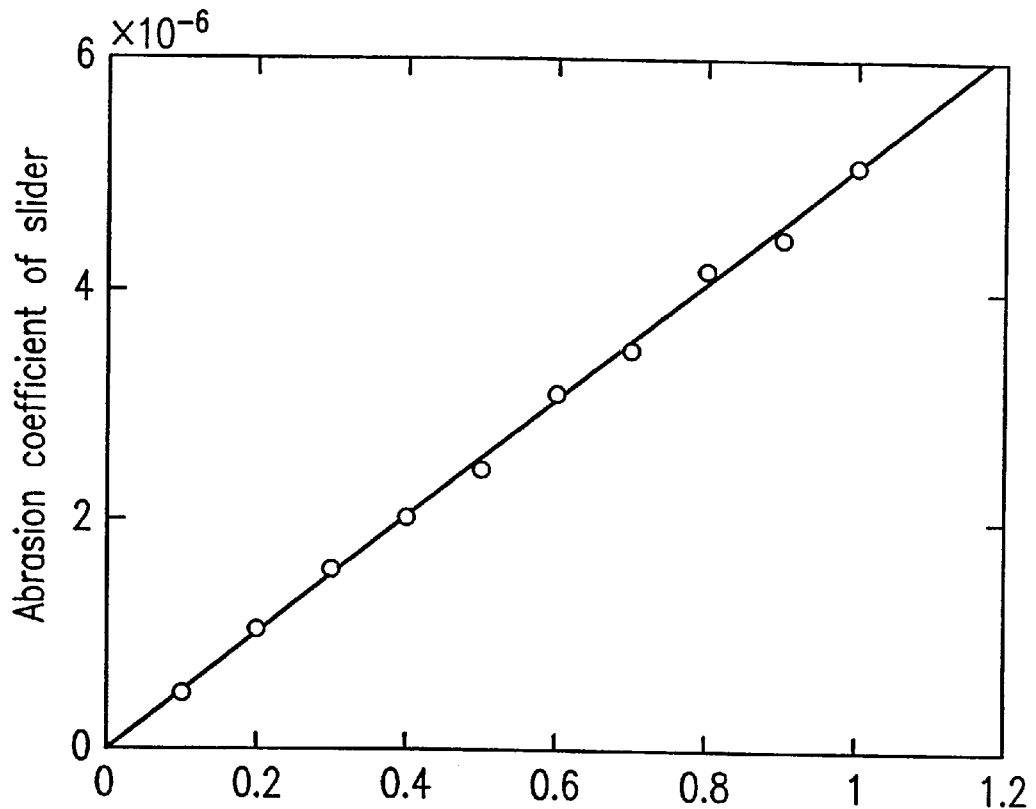
FIG. 16 is a graph showing the relationship among the effective value of the output voltage of an AE sensor, the relative speed between a slider and a magnetic disk, the vertical force between the slider and the magnetic disk, and the abrasion coefficient of the slider for the contact tester of Embodiment 11.

By previously preparing a relationship diagram as shown in FIG. 16, therefore, the abrasion coefficient of the slider 2 caused by the sliding between the slider 2 and the magnetic disk 1 can be obtained from the effective value of the signal voltage of the AE sensor 101 and the relationship diagram. The abrasion coefficient is defined as a value obtained by dividing the product of the abrasion volume and the plastic flow pressure which is substantially equal to the surface hardness of the material by the product of the normal force and the sliding distance, according to an Archard equation (see "Outline of Tribology", Yoken-do, and J. Appl. Phys., 24, 8 (1953), 981).

Figure 17:
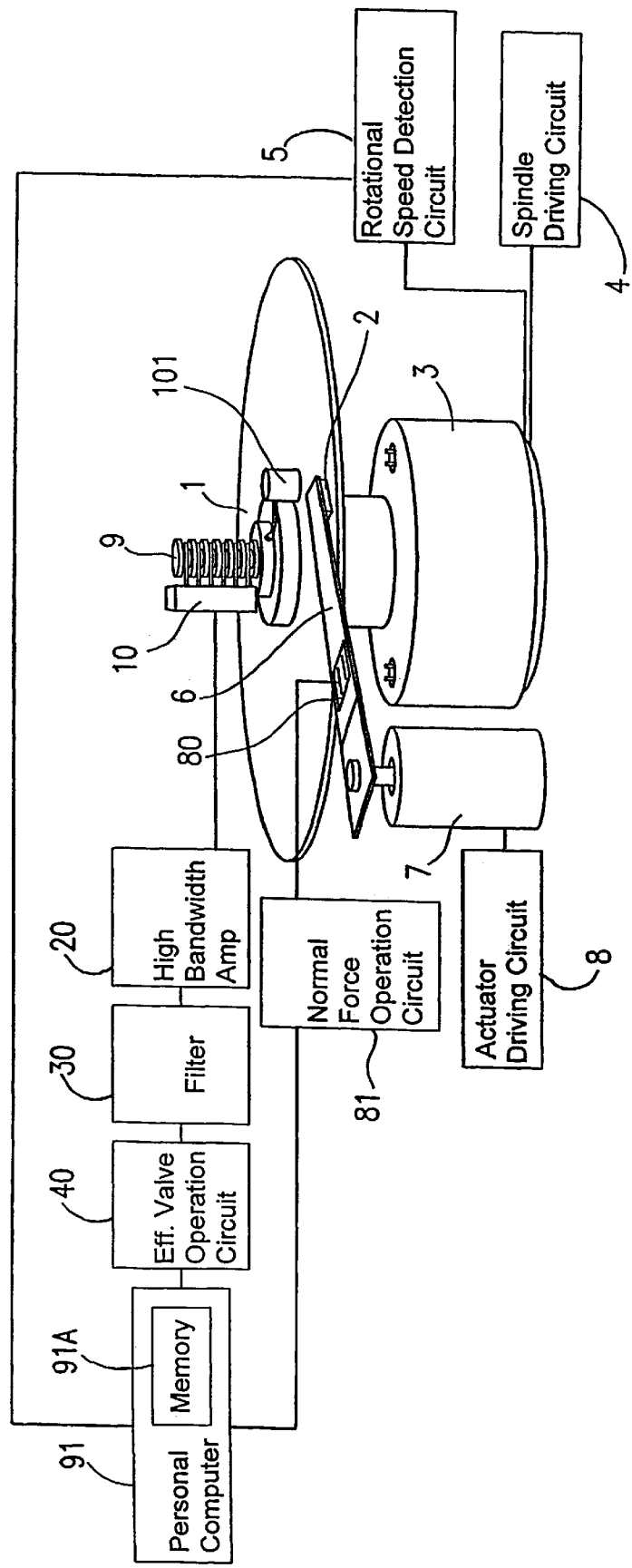
FIG. 17 is a block diagram illustrating a second example of the contact tester of Embodiment 11 according to the present invention.

FIG. 17 illustrates a contact tester 1700 of a second example of the Embodiment 11. Description of portions of the configuration similar to those of the first example is omitted.

Referring to FIG. 17, a personal computer 91 is provided, which automatically operates the abrasion coefficient based on the expression stored in a memory 91A representing the relationship among the effective value of the output voltage of the AE sensor 101, the relative speed between the slider 2 and the magnetic disk 1, the normal force between the slider 2 and the magnetic disk 1, and the abrasion coefficient of the slider 2, the effective value of the detected output voltage of the AE sensor 101, the relative speed, and the normal force. A relationship as shown in FIG. 16, for example, is pre-stored in the memory 91A as an expression. The personal computer 91 is connected to the outputs of the rotational speed detection circuit 5, the effective value operation circuit 40, and the normal force operation circuit 81. The relative speed between the slider 2 and the magnetic disk 1 is calculated based on the rotational speed of the magnetic disk 1 output from the rotational speed detection circuit 5 and the position of the slider 2 above the magnetic disk 1 in a radial direction of the magnetic disk 1 (pre-stored in the memory 91A of the personal computer 91). The effective value of the output voltage of the AE sensor 101 is obtained from the effective value operation circuit 40. The normal force between the slider 2 and the magnetic disk 1 is obtained from the normal force operation circuit 81. From the above information, the abrasion coefficient of the slider 2 can be automatically calculated in accordance with a predetermined program.

Thus, in the second example described above, in addition to obtaining the same effect as that described in the first example of Embodiment 11, the abrasion coefficient can be efficiently determined without the necessity of reading a value from the relationship diagram. As in Embodiment 10, the relationship among the effective value of the output voltage of the AE sensor, the relative speed between the slider and the magnetic disk, the normal force between the slider and the magnetic disk, and the abrasion coefficient of the slider is generally represented by:

$$V = \alpha(kNv)^{0.5} + \beta$$

wherein V denotes the effective value of the output voltage of the AE sensor, v denotes the relative speed between the slider and the magnetic disk, N denotes the normal force between the slider and the magnetic disk, k denotes the abrasion coefficient, and $\alpha$ and $\beta$ denote constants. This is described in the above-mentioned Japanese Laid-Open Publication No. 9-43130. Although a large amount of data were used to obtain the relationship diagram shown in FIG. 16, it should be understood that a relationship diagram or expression with sufficiently high precision can be obtained from a smaller amount of data by using the relationship described above, as in Embodiment 10.

In Embodiment 11, since the AE sensor 101 is mounted on the magnetic disk 1, not on the arm as in the conventional apparatus, the detection results are not influenced by a vibration of the arm and the inertia of the AE sensor, as in the case of the measurement of the normal force between the slider 2 and the magnetic disk 1 in Embodiment 10. This enables to determine the abrasion coefficient of the slider with high precision.

Embodiment 12

Figure 18:
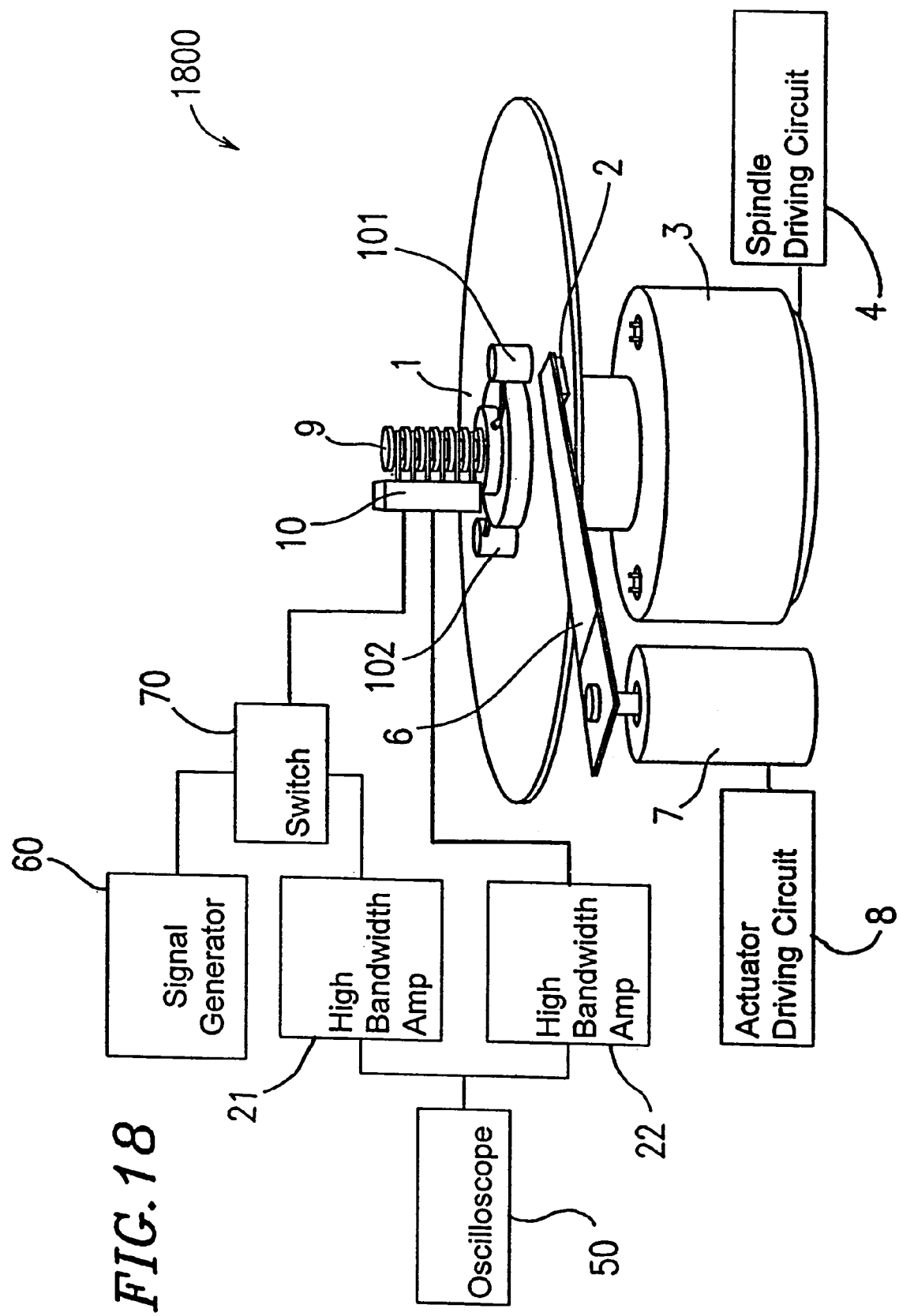
FIG. 18 is a block diagram illustrating a contact tester of Embodiment 12 according to the present invention.

FIG. 18 illustrates a contact tester 1800 of Embodiment 12 according to the present invention. In this embodiment, portions of the configuration similar to those of Embodiment 10 is omitted.

Referring to FIG. 18, AE sensors 101 and 102 are mounted on the magnetic disk 1 as a recording medium for detecting a minute vibration generated by a contact between the slider 2 and the magnetic disk 1. The AE sensors 101 and 102 are composed of a piezoelectric element (PZT), for example, and connected to high bandwidth amplifiers 21 and 22 for amplifying output signals of the AE sensors 101 and 102, respectively. The contact tester 1800 of this embodiment further includes: an oscilloscope 50 for analyzing the output signal, a signal generator 60, and a switch 70 for switching the connection of the output terminal of the AE sensor 101 between the input of the high bandwidth amplifier 21 and the output of the signal generator 60.

The operation of the contact tester 1800 will be described. Before the start of the contact test between the slider 2 and the magnetic disk 1, the switch 70 is switched to connect the AE sensor 101 with the signal generator 60, to allow a predetermined signal to be input into the AE sensor 101 from the signal generator 60. Simultaneously, an output signal of the AE sensor 102 is analyzed by the oscilloscope 50, to calibrate the AE sensors 101 and 102 or check the operation thereof. This enables to correct a variation in properties of the AE sensor 102, for example, when the AE sensor 102 is exchanged by comparing the properties of the new AE sensor with those of the old AE sensor. Then, the switch 70 is switched to connect the output terminal of the AE sensor 101 with the input of the high bandwidth amplifier 21. Under this state, an AE or acoustic stress wave generated by a contact between the slider 2 and the magnetic disk 1 is detected by the AE sensors 101 and 102 and converted into electrical signals. The output signals of the AE sensors 101 and 102 are transmitted via the slip ring 9 which is connected to the AE sensors 101 and 102 and then the brush 10, to be retrieved outside the spindle 3. The resultant output signals of the AE sensors 101 and 102 are then amplified by the high bandwidth amplifier 21 and 22 by about 40 dB to about 60 dB so as to obtain voltages sufficiently large for signal analysis. The amplified signals are analyzed by the oscilloscope 50, to determine the strength, duration, and the like of the contact. With the configuration described above, calibration of the AE sensors and check of the operation of the entire contact tester can be easily carried out without the necessity of additionally disposing a vibration source for calibration in contact with the magnetic disk 1.

In Embodiment 12, two AE sensors were mounted on the magnetic disk 1 and one of them was connected with the signal generator. Alternatively, both AE sensors may be connected with the signal generator. If three or more AE sensors are mounted, part or all of the AE sensors may be connected with the signal generator to obtain the same effect. In this embodiment, the AE sensor was used as the vibration detection element. Alternatively, an acceleration sensor, for example, may be used.

Embodiment 13

Figure 19:
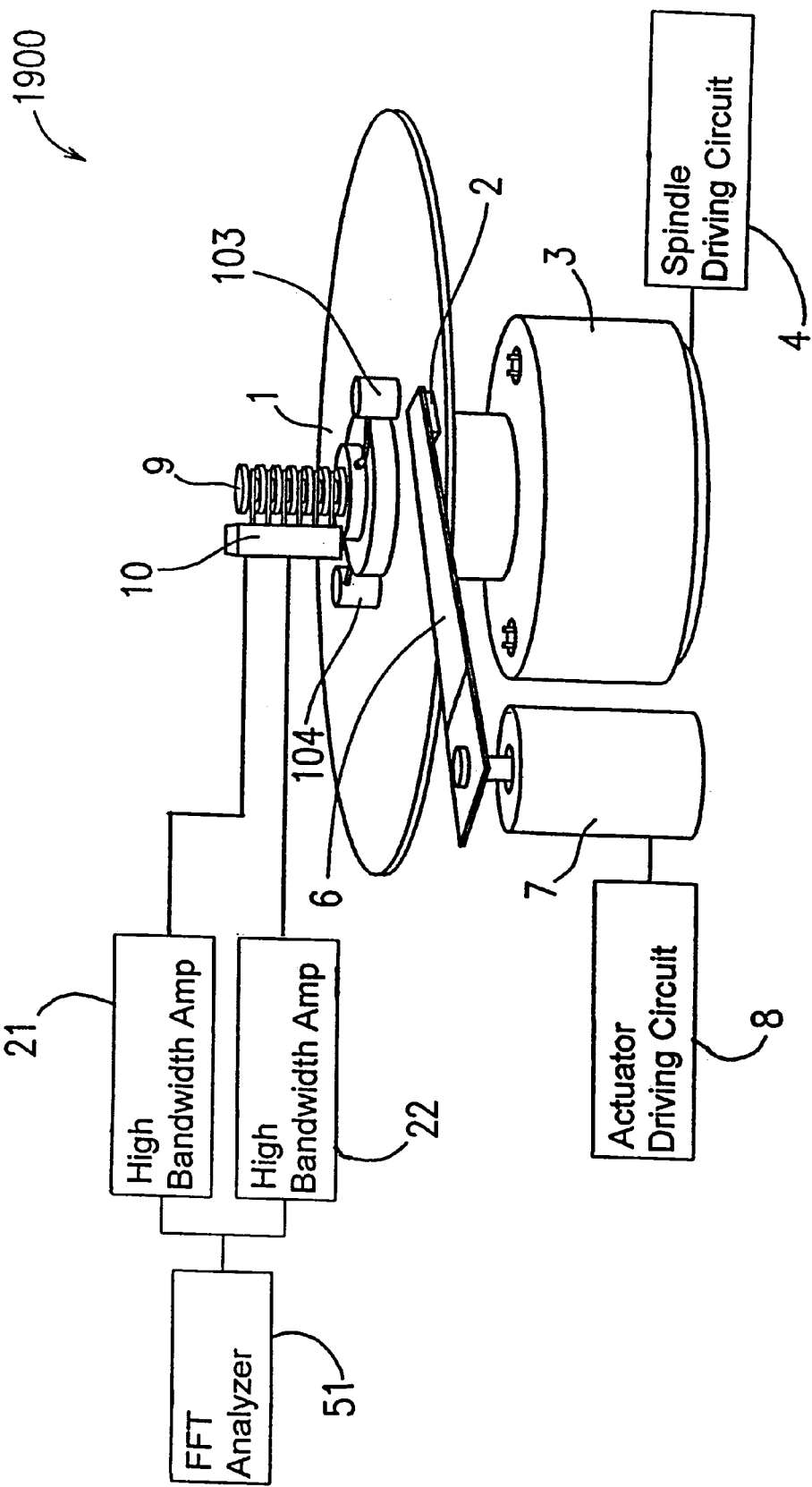
FIG. 19 is a block diagram illustrating a first example of a contact tester of Embodiment 13 according to the present invention.

FIG. 19 illustrates a contact tester 1900 of a first example of Embodiment 13 according to the present invention. In this embodiment, portions of the configuration similar to those of Embodiment 10 is omitted.

Referring to FIG. 19, AE sensors 103 and 104 are mounted on the magnetic disk 1 as a recording medium for detecting a minute vibration generated by a contact between the slider 2 and the magnetic disk 1. The AE sensors 103 and 104 are composed of a piezoelectric element (PZT), for example, and connected to high bandwidth amplifiers 21 and 22 for amplifying output signals of the AE sensors 103 and 104, respectively. A slip ring 9 and a brush 10 constitute a signal transmission means. An FFT analyzer 51 analyzes the output signals.

Figure 20A:
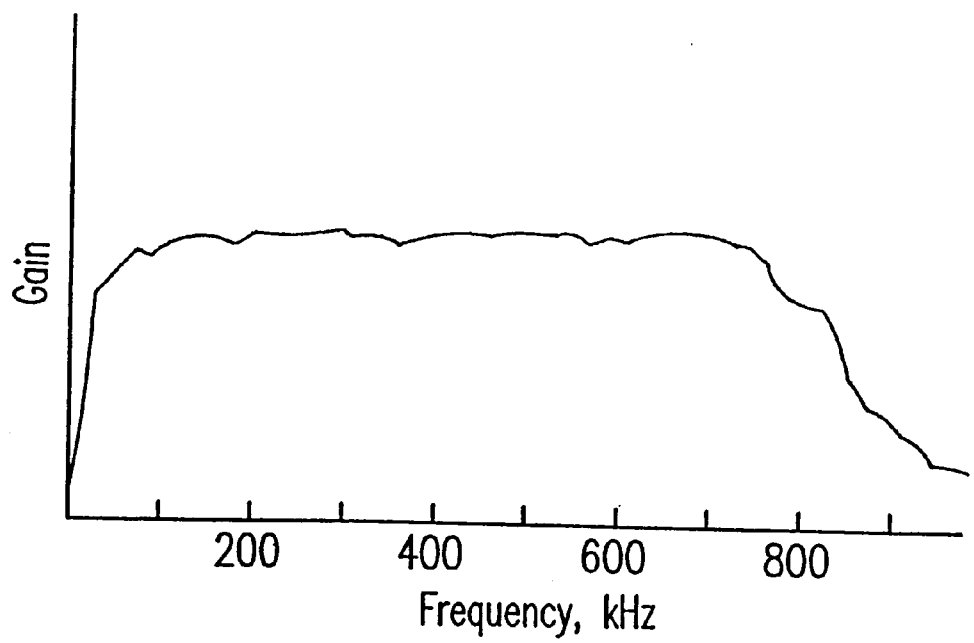
FIGS. 20A and 20B are graphs showing the frequency characteristics of an AE sensor used in the first example of the contact tester of Embodiment 13.
Figure 20B:
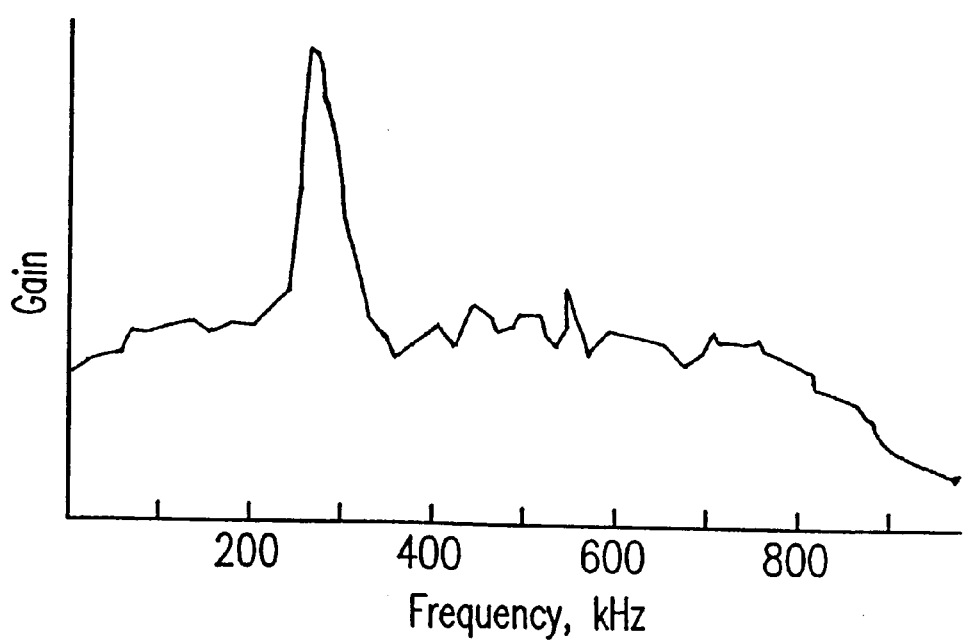

More specifically, the AE sensors 103 and 104 have frequency characteristics shown in FIGS. 20A and 20B, respectively. That is, the AE sensor 103 has a gain characteristic which is substantially flat over a wide frequency bandwidth, which is suitable for frequency analysis and the like. On the contrary, the AE sensor 104 has a gain characteristic which is high for a specific frequency, which is suitable for high-precision detection of a specific frequency component. In Embodiment 13, as the AE sensor 104, an AE sensor which has a high gain at 300 KHz where the largest AE output was observed at the contact between the slider 2 and the magnetic disk 1.

The operation of the contact tester 1900 will be described. AE or acoustic stress wave generated by a contact between the slider 2 and the magnetic disk 1 is detected by the AE sensors 103 and 104, and converted into electrical signals. The output signals of the AE sensors 103 and 104 are transmitted outside the rotating body via the slip ring 9 which is connected to the output terminals of the AE sensors 103 and 104 and then the brush 10. The resultant output signals of the AE sensors 103 and 104 are amplified by the high bandwidth amplifiers 21 and 22, respectively, by about 40 dB to about 60 dB, to obtain voltages sufficiently large for signal analysis. The amplified output signals are sent to the FFT analyzer 51 where the signal from the AE sensor 103 is used for frequency analysis and the like while the signal from the AE sensor 104 is used for high-precision contact detection and the like.

Thus, in this embodiment, since at least two AE sensors having different frequency characteristics are mounted on the magnetic disk 1, different analyses can be performed simultaneously, which is not possible using AE sensors having the same frequency characteristic.

Figure 21:
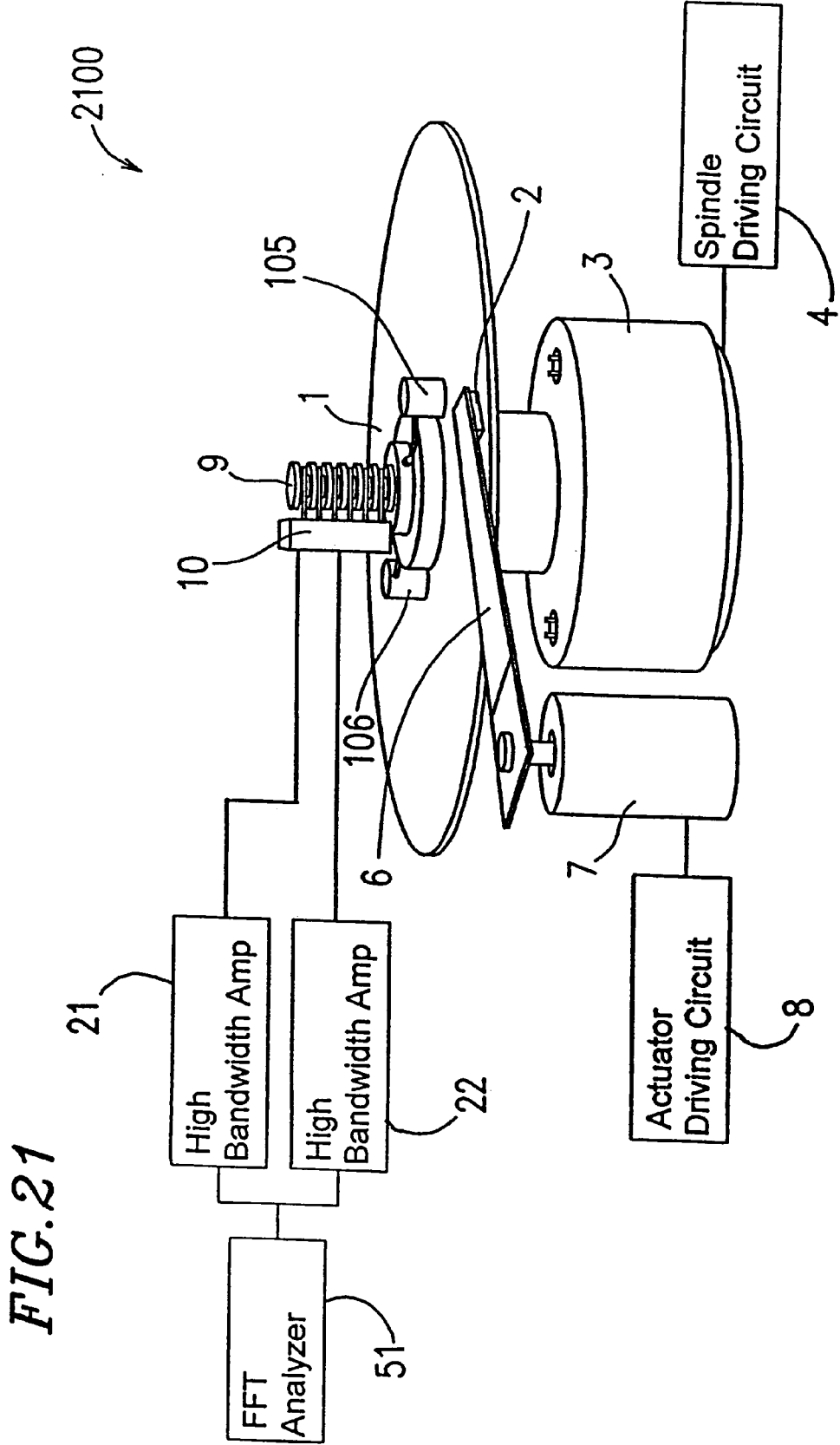
FIG. 21 is a block diagram illustrating a second example of the contact tester of Embodiment 13 according to the present invention.
Figure 22A:
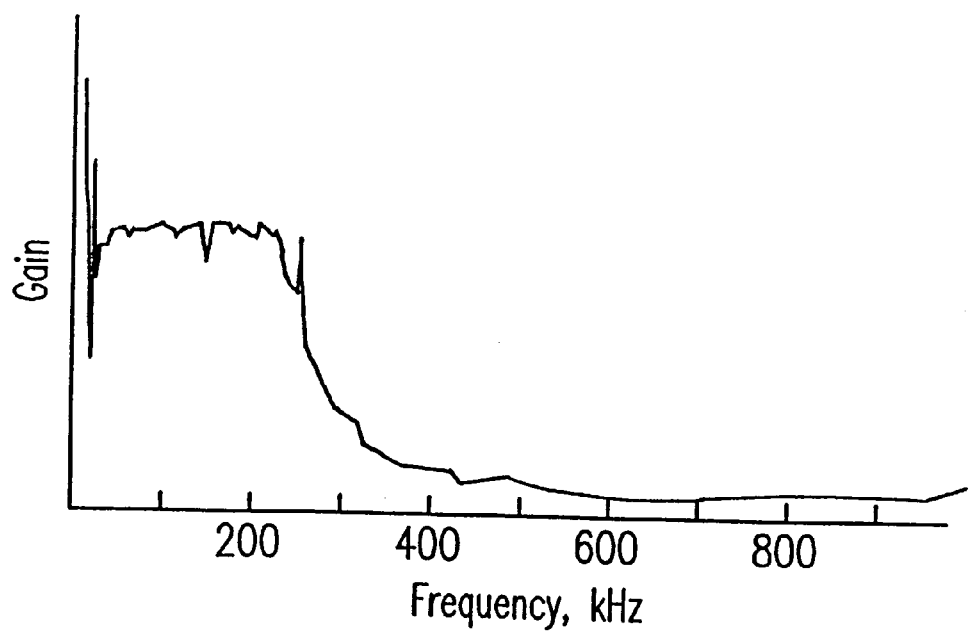
FIGS. 22A and 22B are graphs showing the frequency characteristics of an AE sensor used in the second example of the contact tester of Embodiment 13.
Figure 22B:
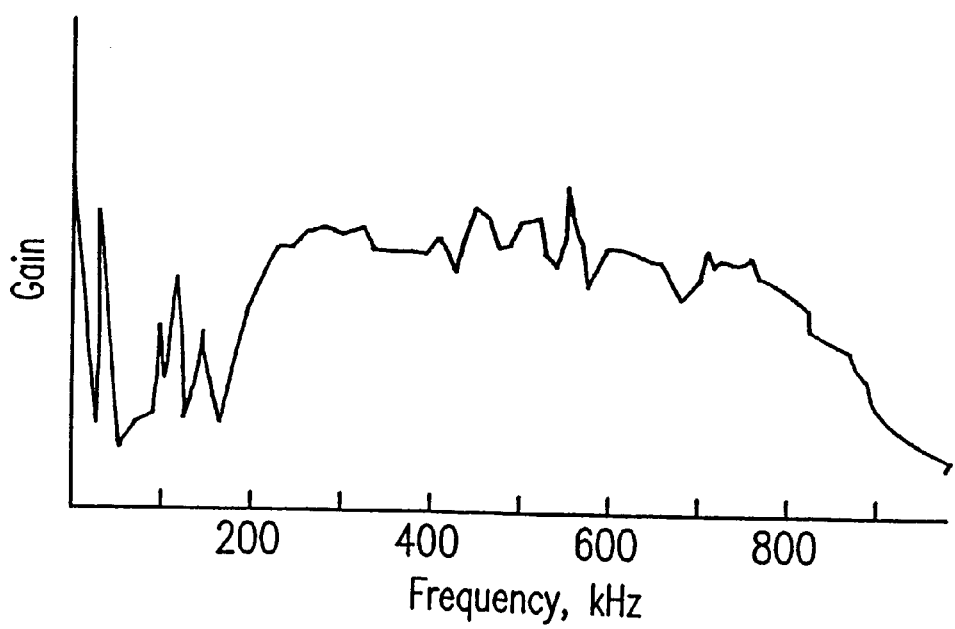

FIG. 21 illustrates a contact tester 2100 of a second example of Embodiment 13 according to the present invention. In this example, AE sensors 105 and 106 have frequency characteristics shown in FIGS. 22A and 22B, respectively. That is, the AE sensor 105 detects a signal of a lower frequency range, and the AE sensor 106 detects a signal of a higher frequency range. Since the frequency characteristic of an AE sensor is determined by the size of the sensor, it is difficult to obtain a gain over a wide bandwidth by one AE sensor. By using two AE sensors having different bandwidths, it is possible to realize a pseudo AE sensor having a wide bandwidth which actually cannot b e obtained by one AE sensor.

In Embodiment 13, two AE sensors were used. The above effect can also be obtained in the case of using three or more AE sensors. In this embodiment, the AE sensors were used as a vibration detection element. Alternatively, a n acceleration sensor, for example, may be used.

Embodiment 14

Figure 23:
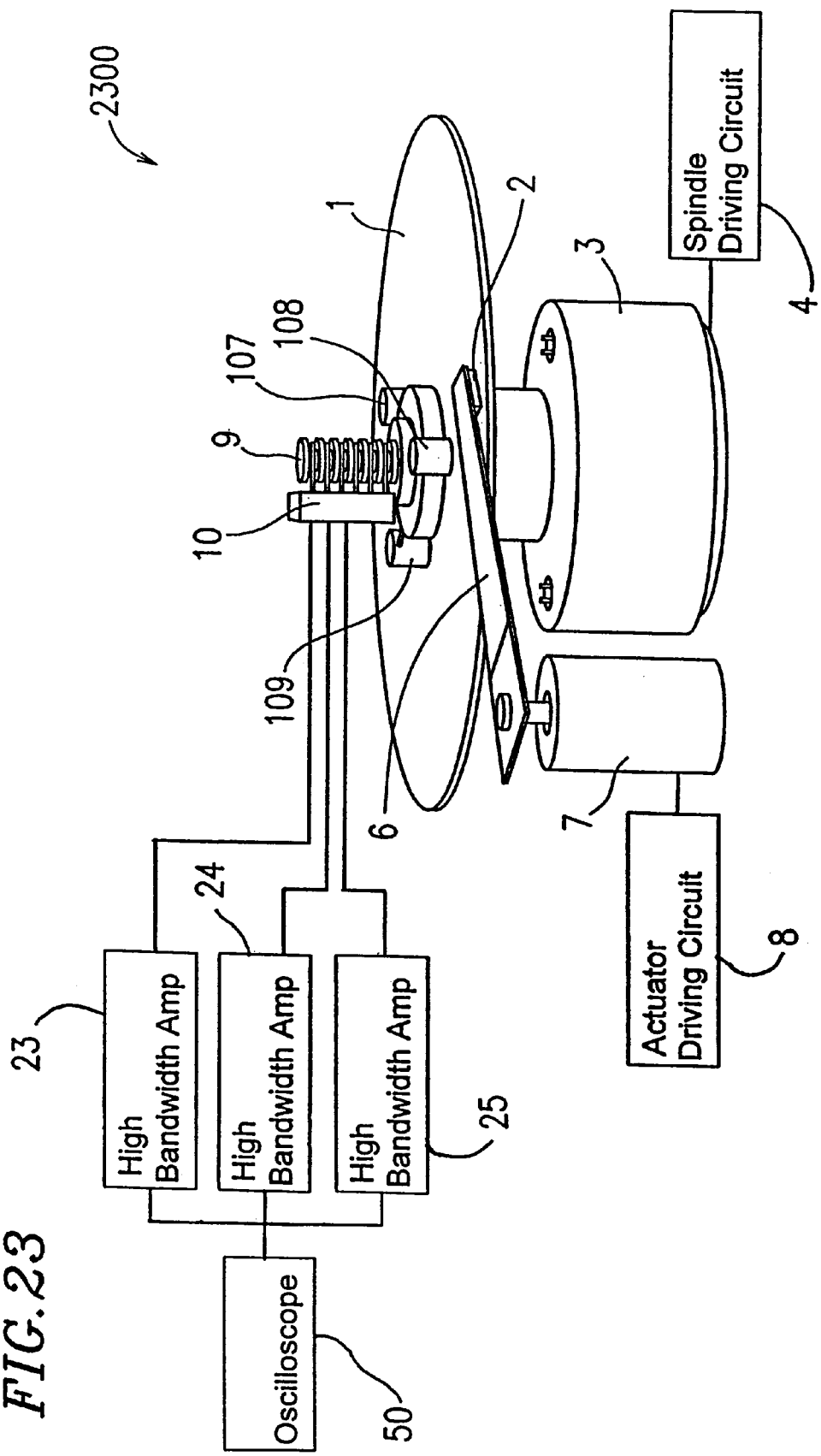
FIG. 23 is a block diagram illustrating a contact tester of Embodiment 14 according to the present invention.

FIG. 23 illustrates a contact tester 2300 of Embodiment 14 according to the present invention. In this embodiment, portions of the configuration similar to those of Embodiment 10 is omitted.

Referring to FIG. 23, AE sensors 107, 108, and 109 are mounted on the magnetic disk 1 as a recording medium for detecting a minute vibration generated by a contact between the slider 2 and the magnetic disk 1. The AE sensors 107, 108, and 109 are composed of a piezoelectric element (PZT), for example, and connected to high bandwidth amplifiers 23, 24, and 25 for amplifying output signals of the AE sensors 107, 108, and 109, respectively. A slip ring 9 and a brush 10 constitute a signal transmission means. An oscilloscope 50 analyzes the output signals.

More specifically, the AE sensors 107, 108, and 109 have the same mass, and are arranged at a same distance from the rotational center of the spindle 3 spaced by 120 degrees from one another. With this configuration, the center of the entire gravity of the AE sensors matches with the rotational center axis of the spindle 3, indicating that the balance of the rotating body is not lost by the mounting of the AE sensors. This prevents a generation of irregularity and vibration during rotation, and thus allows for a contact evaluation under the same conditions as those for the actual magnetic disk device.

In Embodiment 14, three AE sensors were used. It should be understood that any number of AE sensors can be used as long as they are arranged so that the center of the entire gravity of the AE sensors matches with the rotational center axis of the spindle 3, to obtain the same effect. In this embodiment, the AE sensors were used as the vibration detection elements. Alternatively, acceleration sensors, for example, may be used. Although the case of the AE sensors having the same mass was described, the AE sensors may have different masses to obtain the above-described effect.

Thus, according to the present invention, by mounting the vibration detection element on the disk or the disk holding mechanism, the influence of the vibration of the arm on the detection of a contact between the slider and the disk, as well as the influence of the vibration detection element on the evaluation system, can be reduced. Moreover, since the contact can be detected on the disk side, the influence of the contact on the disk can be evaluated with high precision. If the vibration detection elements are mounted both on the slider side and the disk side to detect the contact, the detection precision improves.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A contact tester comprising:
   a holding mechanism for holding a disk and rotating integrally with the disk;
   arm driving means for driving an arm which supports a slider, the slider being provided with a head for recording/reproducing information on/from the disk;
   a first vibration detection element for detecting a contact between the slider and the disk;
   signal transmission means for transmitting an output signal of the first vibration detection element; and
   signal analysis means for analyzing the output signal transmitted via the signal transmission means,
   wherein the first vibration detection element is mounted at a position where a vibration of the arm is not detected.

2. A contact tester according to claim 1, wherein the first vibration detection element is mounted on the disk.

3. A contact tester according to claim 1, wherein the first vibration detection element is mounted at the holding mechanism.

4. A contact tester according to claim 1, further comprising a second vibration detection element which is mounted on the arm.

5. A contact tester according to claim 1, wherein the signal transmission means includes: a rotary conductor secured to the holding mechanism to rotate integrally with the holding mechanism; and a contact conductor secured so as to be in contact with the rotary conductor, and
   the signal transmission means transmits the output signal via a contact between the rotary conductor and the contact conductor.

6. A contact tester according to claim 5, wherein the rotary conductor comprises a slip ring and the contact conductor comprises a brush.

7. A contact tester according to claim 1, wherein the signal transmission means includes: a signal transmitter which rotates integrally with the rotation of the holding mechanism for transmitting the output signal of the first vibration detection element in the air; and a signal receiver for receiving the output signal transmitted by the signal transmitter, and
   the signal transmission means transmits the output signal in a non-contact manner between the signal transmitter and the signal receiver.

8. A contact tester according to claim 7, wherein the signal transmitter comprises a rotational transformer and the signal receiver comprises a fixed transformer.

9. A contact tester according to claim 7, further comprising impedance conversion means disposed at the holding mechanism for converting an output impedance of the output signal of the first vibration detection element,
   wherein the signal transmission means transmits the output signal of which impedance has been converted by the impedance conversion means.

10. A contact tester according to claim 9, further comprising a battery disposed at the holding mechanism for supplying electric power to the impedance conversion means.

11. A contact tester according to claim 9, wherein the impedance conversion means includes a field effect transistor at an input stage thereof.

12. A contact tester according to claim 9, wherein an input impedance of the impedance conversion means is 10 kiloohms or more.

13. A contact tester according to claim 1, wherein the first vibration detection element comprises an AE sensor.

14. A contact tester according to claim 1, wherein the holding mechanism includes a hydrodynamic bearing.

15. A contact tester according to claim 1, further comprising a second vibration detection element mounted on the arm for detecting a contact between the slider and the disk,
   wherein the signal analysis means includes:
      first amplifying means for amplifying the output signal sent from the signal transmission means;
      first effective value operation means for calculating a first effective value from the output signal amplified by the first amplifying means;
      first signal processing means for determining whether or not the first effective value calculated by the first effective value operation means exceeds a predetermined value and outputting the result as a first determination result;
      second amplifying means for amplifying a second output signal of the second vibration detection element;
      second effective value operation means for calculating a second effective value from the second output signal amplified by the second amplifying means;
      second signal processing means for determining whether or not the second effective value calculated by the second effective value operation means exceeds a predetermined value and outputting the result as a second determination result; and contact determination means for determining a contact between the slider and the disk based on the first determination result and the second determination result.

16. A contact tester according to claim 1, wherein the holding mechanism includes signal amplifying means for amplifying the output signal, and the signal transmission means transmits the output signal amplified by the signal amplifying means.

17. A contact tester according to claim 16, further comprising power supply means for supplying electric power to the signal amplifying means.

18. A contact tester according to claim 16, further comprising a battery mounted at the holding mechanism for supplying electric power to the signal amplifying means.

19. A contact tester according to claim 16, wherein the signal amplifying means includes a field effect transistor at an input stage thereof.

20. A contact tester according to claim 16, wherein an input impedance of the signal amplifying means is 10 kiloohms or more.

21. A contact tester according to claim 1, wherein the holding mechanism includes an elastic member for urging the first vibration detection element toward the disk with a constant force.

22. A contact tester according to claim 1, further comprising an acoustic blocking member disposed between the disk and the holding mechanism for isolating the disk from a vibration from the holding mechanism.

23. A contact tester according to claim 1, further comprising:

rotational speed detection means for detecting the rotational speed of the disk;

relative speed calculation means for calculating a relative speed between the disk and the slider based on the rotational speed and a position of the slider and outputting the result; and effective value calculation means for calculating an effective value of the output signal and outputting the result.

24. A contact tester according to claim 23, further comprising:

a first memory for storing a first expression representing a relationship among the relative speed, the effective value, and a normal force between the slider and the disk; and normal force calculation means for calculating the normal force based on the relative speed calculated by the relative speed calculation means, the effective value calculated by the effective value calculation means, and the first expression stored in the first memory.

25. A contact tester according to claim 24, wherein the first expression is:

$$V=\alpha(Nv)^{0.5}+\beta$$

wherein V denotes the effective value of the output signal of the first vibration detection element, v denotes the relative speed between the slider and the disk, N denotes the normal force between the slider and the disk, and $\alpha$ and $\beta$ denote constants.

26. A contact tester according to claim 24, further comprising:

a second memory for storing a second expression representing a relationship among the relative speed, the effective value, the normal force between the slider and the disk, and an abrasion coefficient of the slider; and abrasion coefficient calculation means for calculating the abrasion coefficient based on the relative speed calculated by the relative speed calculation means, the effective value calculated by the effective value calculation means, the normal force calculated by the normal force calculation means, and the second expression stored in the second memory.

27. A contact tester according to claim 26, wherein the second expression is:

$$V=\alpha(kNv)^{0.5}+\beta$$

wherein V denotes the effective value of the output signal of the first vibration detection element, v denotes the relative speed between the slider and the disk, N denotes the normal force between the slider and the disk, k denotes the abrasion coefficient of the slider, and $\alpha$ and $\beta$ denote constants.

28. A contact tester according to claim 1, further comprising:

at least one additional first vibration detection element; and a signal generator for applying a voltage to at least one of the first vibration detection elements.

29. A contact tester according to claim 1, wherein the first vibration detection element comprises two vibration detection elements, one of the two vibration detection elements having a first frequency characteristic and the other vibration detection element having a second frequency characteristic which is different from the first frequency characteristic.

30. A contact tester according to claim 1, wherein the first vibration detection element comprises at least one vibration detection element, and the entire gravity of the at least one vibration detection element substantially exists on a rotational center axis of the holding mechanism.

* * * * *